(12) United States Patent
Zhou

(10) Patent No.: US 12,226,694 B2
(45) Date of Patent: Feb. 18, 2025

(54) METHOD AND APPARATUS FOR ACQUIRING POSITION IN VIRTUAL SCENE, DEVICE, MEDIUM AND PROGRAM PRODUCT

(71) Applicant: Tencent Technology (Shenzhen) Company Limited, Shenzhen (CN)

(72) Inventor: Minke Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 263 days.

(21) Appl. No.: 17/963,133

(22) Filed: Oct. 10, 2022

(65) Prior Publication Data

US 2023/0033530 A1 Feb. 2, 2023

Related U.S. Application Data

(63) Continuation of application No. PCT/CN2021/122894, filed on Oct. 9, 2021.

(30) Foreign Application Priority Data

Nov. 20, 2020 (CN) .......................... 202011309691.5

(51) Int. Cl.
*A63F 13/537* (2014.01)
*A63F 13/573* (2014.01)

(52) U.S. Cl.
CPC .......... *A63F 13/537* (2014.09); *A63F 13/573* (2014.09); *A63F 2300/8076* (2013.01)

(58) Field of Classification Search
CPC ................. A63F 13/537; A63F 13/573; A63F 2300/8076
See application file for complete search history.

(56) References Cited

U.S. PATENT DOCUMENTS

2007/0218966 A1 9/2007 Tilston et al.
2010/0144433 A1* 6/2010 Yamada .................. A63F 13/45
463/31

FOREIGN PATENT DOCUMENTS

CN 111111166 A 5/2020
CN 111111168 A 5/2020
CN 111202982 A 5/2020
(Continued)

OTHER PUBLICATIONS

Mirage Season 5 Advanced Decoy Control Guide! Aggressive Corner Checks + Door Bamboozles! (Year: 2020).*
(Continued)

*Primary Examiner* — Reginald A Renwick
(74) *Attorney, Agent, or Firm* — Morgan, Lewis & Bockius LLP

(57) ABSTRACT

This application provides a method for acquiring a position of a virtual object in a virtual scene performed at an electronic device. The method includes: presenting an operation control of a target virtual prop in a virtual scene; in response to a virtual image generation operation on the operation control, controlling a first virtual object to generate a virtual image corresponding to the first virtual object in the virtual scene by using the target virtual prop; and when (Continued)

a second virtual object interacting with the virtual image exists in the virtual scene, presenting a position of the second virtual object in the virtual scene.

20 Claims, 17 Drawing Sheets

(56) References Cited

FOREIGN PATENT DOCUMENTS

| CN | 111249725 A | 6/2020 |
|----|-------------|--------|
| CN | 112402946 A | 2/2021 |
| JP | 2007050225 A | 3/2007 |
| JP | 2022549455 A | 11/2022 |
| WO | WO 2013122206 A1 | 8/2013 |

OTHER PUBLICATIONS

Apex Legends Mirage Guide (You Got Bamboozled!) (Year: 2019).*
SkilltownCommunity, (Apex) "A Thorough Explanation of how to Use Mirage's Ult and how to Fight!", May 28, 2020, https://skilltown.jp/community/note/138, Retrieved from the Internet; Jan. 10, 2024, 13 pgs.
Tencent Technology, Japanese Office Action, JP Patent Application No. 2023518144, Jan. 16, 2024, 12 pgs.
YouTube.com, (Apex/PS4) "Mirage Commentary!! Mastering the Use of Decoys" (Character Commentary), Nov. 17, 2019, https://www.youtube.com/watch?v=HYPDK62xIwo, Retrieved from the Internet; Jan. 10, 2024, 10 pgs.
Tencent Technology, WO, PCT/CN2021/122894, Jan. 6, 2022, 5 pgs.
Tencent Technology, IPRP, PCT/CN2021/122894, May 16, 2023, 6 pgs.
Baidu videos, "This is Tough Enough! Use "Phantom Clone" to Eat Chicken, so that the Enemy Has Nowhere to Hide", Author: Come, Senpai, Dec. 1, 2019, 1 pg., Retrieved from the Internet: https://haokan.baidu.com/v?pd=wisenatural&vid=11208495154367620875.
Bilibili videos, "The Phantom Scepter is a Good Thing Warcraft Xiaoy Commentary Moon Focus AZ1", Nov. 11, 2017, 2 pgs., Retrieved from the Internet: https://www.bilibili.com/video/BV14x41177wo/?from=search&seid=10328972856203392411&spm_id_from=333.337.0.0.
Tencent Technology, ISR, PCT/CN2021/122894, Jan. 6, 2022, 3 pgs.

* cited by examiner

METHOD AND APPARATUS FOR ACQUIRING POSITION IN VIRTUAL SCENE, DEVICE, MEDIUM AND PROGRAM PRODUCT

CROSS-REFERENCE TO RELATED APPLICATIONS

This application is a continuation application of PCT Patent Application No. PCT/CN2021/122894, entitled "POSITION ACQUISITION METHOD AND APPARATUS IN VIRTUAL SCENE, DEVICE. MEDIUM AND PROGRAM PRODUCT" filed on Oct. 9, 2021, which claims priority to Chinese Patent Application No. 202011309691.5, filed with the State Intellectual Property Office of the People's Republic of China on Nov. 20, 2020, and entitled "POSITION OBTAINING METHOD AND DEVICE IN VIRTUAL SCENE, EQUIPMENT AND STORAGE MEDIUM", all of which are incorporated herein by reference in their entirety.

FIELD OF THE TECHNOLOGY

This application relates to a human-computer interaction technology, and in particular to a method and apparatus for acquiring a position in a virtual scene, a device, a computer-readable storage medium and a computer program product.

BACKGROUND OF THE APPLICATION

In the application of the virtual scene, in order to improve the interaction efficiency between virtual objects, the position information of the virtual objects can be displayed in a virtual scene, so that a first virtual object can know the position of a second virtual object in the virtual scene.

In the related art, the method to realize the display of the position information of the second virtual object so that the first virtual object knows the position of the second virtual object is that the first virtual object performs interaction with other virtual objects for multiple times, and when an obtained interaction achievement reaches an achievement threshold or a reached interaction level reaches a certain level, the position information of the second virtual object is displayed in the virtual scene. However, this method is difficult for the first virtual object. It is required to perform multiple interactive operations, resulting in that the efficiency of human-computer interaction is low.

SUMMARY

The embodiments of this application provide a method and apparatus for acquiring a position in a virtual scene, a device, a computer-readable storage medium and a computer program product, which can acquire the position of a virtual object in the virtual scene based on a generated virtual image, and improve the human-computer interaction efficiency.

The technical solutions of the embodiments of the present disclosure are implemented as follows:

an embodiment of this application provides a method for acquiring a position of a virtual object in a virtual scene, which includes:
  presenting an operation control of a target virtual prop in a virtual scene;
  in response to a virtual image generation operation on the operation control, controlling a first virtual object to generate a virtual image corresponding to the first virtual object in the virtual scene by using the target virtual prop; and
  when a second virtual object interacting with the virtual image exists in the virtual scene, presenting a position of the second virtual object in the virtual scene.

An embodiment of this application provides an apparatus for acquiring a position in a virtual scene, which includes:
  a first presentation module, configured to present an operation control of a target virtual prop in a virtual scene;
  a control module, configured to, in response to a virtual image generation operation on the operation control, control a first virtual object to generate a virtual image corresponding to the first virtual object in the virtual scene by using the target virtual prop; and
  a second presentation module, configured to, when a second virtual object interacting with the virtual image exists in the virtual scene, present a position of the second virtual object in the virtual scene.

An embodiment of the present application provides an electronic device, including:
  a memory, configured to store executable instructions; and
  a processor, configured to, when executing the executable instructions stored in the memory, cause the electronic device to implement the method for acquiring a position in a virtual scene provided by the embodiment of this application.

An embodiment of this application provides a non-transitory computer-readable storage medium storing executable instructions which, when executed by a processor of an electronic device, cause the electronic device to implement the method for acquiring the position in the virtual scene provided by the embodiment of this application.

An embodiment of this application provides a computer program product, including a computer program or instruction, which, when executed by a processor, implements the method for acquiring the position in the virtual scene provided by the embodiment of this application.

This embodiment of the present application has the following beneficial effects:

According to the embodiments of this application, an operation control of a target virtual prop is presented in a screen of a virtual scene, and in response to a virtual image generation operation on the operation control, a first virtual object in the virtual scene is controlled to generate a virtual image corresponding to the first virtual object by using the target virtual prop; when a second virtual object interacting with the virtual image exists in the virtual scene, a position of the second virtual object is presented in the virtual scene. It can be seen that in the embodiments of this application, the position of the second virtual object can be determined as long as the second virtual object interacting with the virtual image exists in the virtual scene. That is, in the embodiments of this application, the position of the second virtual object interacting with the virtual image in the virtual scene can be quickly determined through the generated virtual image, and the virtual image can be generated only by using the target virtual prop. Compared with other methods in which multiple interactive operations need to be performed to acquire the position of the virtual object, the embodiments of this application can determine the position information of the virtual object without performing multiple interactive operations, the acquisition efficiency of the position information is high, and the human-computer interaction efficiency is improved.

DESCRIPTION OF EMBODIMENTS

Figure 1:
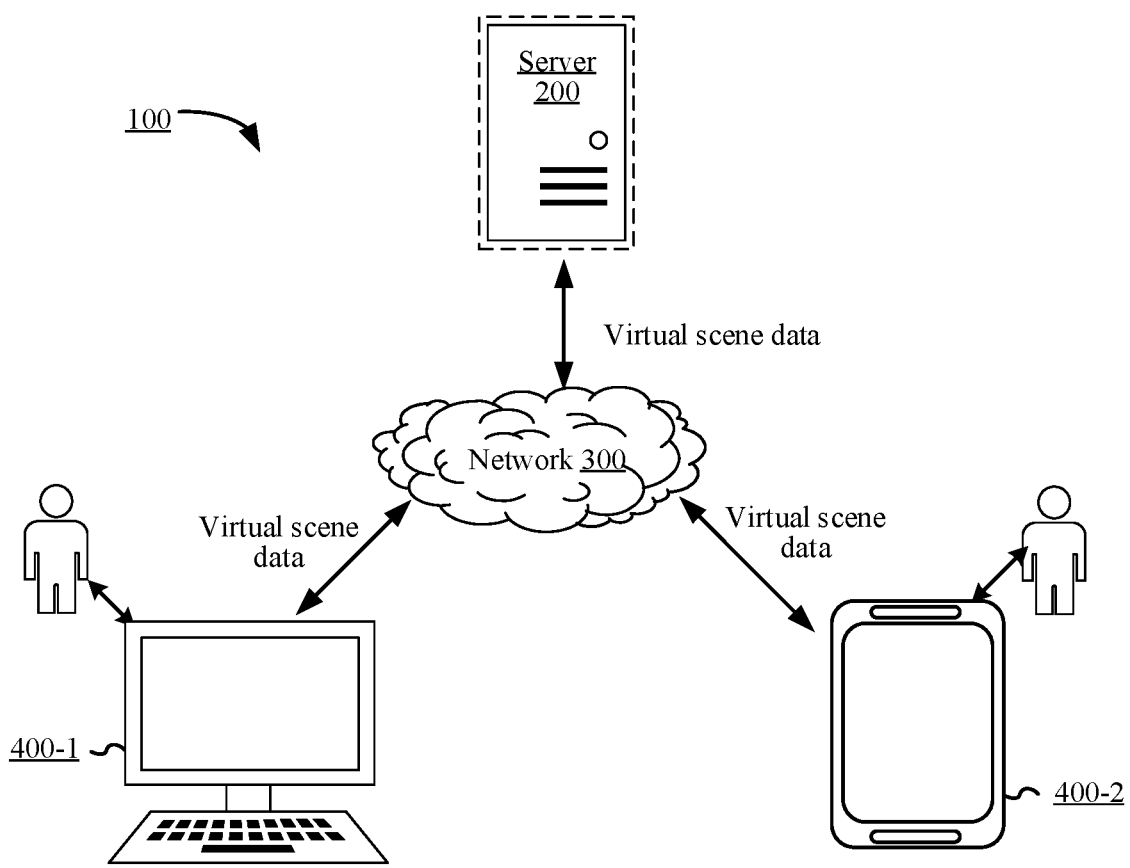
FIG. 1 is a schematic architecture diagram of a system for acquiring a position in a virtual scene provided by an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

1) Client is an application program running in a terminal for providing various services, such as video playback client and game client.

2). The expression "in response to" is used for indicating a condition or a status on which a to-be-performed operation depends. When the condition or the status is satisfied, one or more to-be-performed operations may be real-time or have a set delay. Unless otherwise specified, there is no chronological order between the plurality of to-be-performed operations.

3) Virtual scene: It is a virtual scene displayed (or provided) by an application program when run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this application. For example, the virtual scene may include the sky, the land, the ocean, or the like. The land may include environmental elements such as the desert and a city. The user may control the virtual object to move in the virtual scene.

4) Virtual objects refer to images of various people and objects that can interact in a virtual scene, or movable objects in a virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

In some embodiments, the virtual object may be a player character controlled through an operation on a client, or may be an artificial intelligence (AI) character set in a virtual scene battle through training, or may be a non-player character (NPC) set in a virtual scene interaction. In some embodiments, the virtual object may be a virtual character that performs adversarial interaction in a virtual scene. In some embodiments, a quantity of virtual objects participating in the interaction in the virtual scene may be preset, or may be dynamically determined according to a quantity of clients participating in the interaction.

5) Scene data represents various features of objects in a virtual scene in an interaction process. For example, it can include the positions of the objects in the virtual scene. Of course, different types of features may be included according to the type of virtual scene. For example, in the virtual scene of a game, the scene data may include the time required to wait for various functions configured in the virtual scene (depending on the number of times the same function can be used within a specific time), and may also represent the attribute values of various states of the game character, such as the life value (also known as the red amount) and the magic value (also known as the blue amount).

Referring to FIG. 1, it is a schematic architecture diagram of a system 100 for acquiring a position in a virtual scene provided by an embodiment of this application. To support an exemplary application, terminals (where a terminal 400-1 and a terminal 400-2 are shown as an example) are connected to a server 200 by using a network 300. The network 300 may be a wide area network, a local area network, or a combination thereof. Data transmission is implemented by using a radio link.

The terminals may be various types of user terminals such as smart phones, tablet computers or notebook computers, and may also be desktop computers, game machines, televisions, vehicle-mounted terminals, or any combination of two or more of these data processing devices. The server 200 may be a server configured separately to support various services, a server cluster, or a cloud server.

In practical application, the terminal is installed with and runs an application program supporting virtual scenes. The application program may be any one of First-Person Shooting (FPS) games, Third-Person Shooting games, Multiplayer Online Battle Arena (MOBA) games, Massive Multiplayer Online (MMO) games, Two Dimension (2D) game applications, Three Dimension (3D) game applications, virtual reality applications, three-dimensional map programs, or multi-person gun battle survival games. The application program may also be a stand-alone application program, such as a stand-alone 3D game program. The user uses the terminal to control a virtual object in a virtual scene to perform activities. The activities include, but not limited to, at least one of adjusting body postures, crawling, running, riding, jumping, driving, picking, shooting, attacking, throwing and learning from each other. For example, the virtual object is a virtual character such as a simulated character role or a cartoon character role.

Take an electronic game scenario as an example, a user may perform an operation on a terminal in advance, and a game configuration file of an electronic game may be downloaded after the terminal detects the operation of the user. The game configuration file may include an application, interface display data, virtual scenario data, or the like of the electronic game, so that the user may invoke the game configuration file when logging into the electronic game on the terminal, so as to render and display an electronic game interface. The user may perform a touch operation on the terminal. After detecting the touch operation, the terminal may determine game data corresponding to the touch operation and render and display the game data. The game data may include virtual scene data, behavioral data of a virtual object in the virtual scene, and the like.

In practical application, in response to entering the virtual scene, the terminal sends a request for acquiring scene data of the virtual scene to the server 200, and the server acquires and returns the scene data of the virtual scene to the terminal based on the received request for acquiring the scene data; the terminal receives the scene data of the virtual scene, renders a virtual scene based on the scene data, and presents an operation control of a target virtual prop in the virtual scene; in response to the virtual image generation operation on the operation control, a first virtual object in the virtual scene is controlled to generate a virtual image corresponding to the first virtual object by using the target virtual prop; when a second virtual object interacting with the virtual image exists in the virtual scene, a position of the second virtual object in the virtual scene is presented.

Taking the virtual simulation application as an exemplary scene, the virtual scene technology is used for enabling trainees to truly experience the battlefield environment visually and audibly, familiarize themselves with the environmental features of the combat area, and interact with the objects in the virtual environment through necessary equipment. The method for implementing the virtual battlefield environment can be realized through the corresponding three-dimensional battlefield environment graphic image library, including the combat background, battlefield scene, various weapons, equipment and combat personnel. Through background generation and image synthesis, a dangerous and nearly real three-dimensional battlefield environment can be created.

In practical implementation, in response to entering the virtual scene, the terminal sends a request for acquiring scene data of the virtual scene to the server 200, and the server acquires and returns the scene data of the virtual scene to the terminal based on the received request for acquiring the scene data; the terminal receives the scene data of the virtual scene, renders a virtual scene based on the scene data, and presents an operation control of a target virtual prop in the virtual scene; in response to the virtual image generation operation on the operation control, a first virtual object (such as simulated combat personnel) in the virtual scene is controlled to generate a virtual image corresponding to the first virtual object by using the target virtual prop; when a second virtual object (such as simulated enemy) interacting with the virtual image exists in the virtual scene, a position of the second virtual object in the virtual scene is presented.

Figure 2:
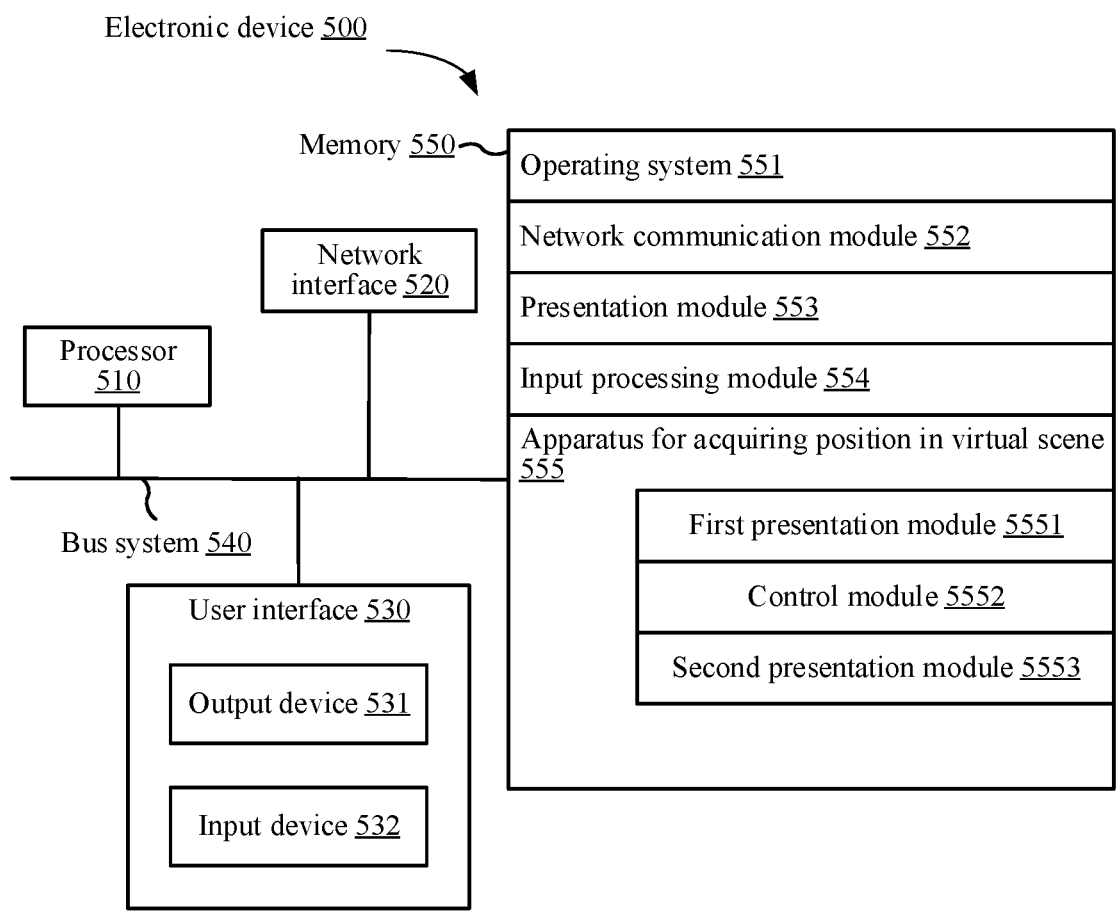
FIG. 2 is a schematic structural diagram of an electronic device provided by an embodiment of this application.

Referring to FIG. 2, it is a schematic structural diagram of an electronic device 500 provided by an embodiment of this application. In practical application, the electronic device 500 may be the terminal 400-1, the terminal 400-2, or the server 200 in FIG. 1. Taking that the electronic device is the terminal 400-1 or the terminal 400-2 in FIG. 1 as an example, a computer device implementing the method for acquiring the position in the virtual scene according to the embodiment of this application will be described. The electronic device 500 shown in FIG. 2 includes at least one processor 510, a memory 550, at least one network interface 520, and a user interface 530. All the components in the electronic device 500 are coupled together by using a bus system 540. It may be understood that the bus system 540 is configured to implement connection and communication between these assemblies. In addition to a data bus, the bus system 540 further includes a power bus, a control bus, and a state signal bus. However, for ease of clear description, all types of buses in FIG. 2 are marked as the bus system 540.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that can display media content, including one or more loudspeakers and/or one or more visual display screens. The user interface 530 further includes one or more input apparatuses 532, including user interface components that facilitate inputting of a user, such as a keyboard, a mouse, a microphone, a touch display screen, a camera, and other input button and control.

The memory 550 may be a removable memory, a non-removable memory, or a combination thereof. Exemplary hardware devices include a solid-state memory, a hard disk drive, an optical disc driver, or the like. The memory 550 optionally includes one or more storage devices that are physically remote from the processor 510.

The memory 550 includes a volatile memory or a non-volatile memory, or may include both a volatile memory and a non-volatile memory. The non-volatile memory may be a read-only memory (ROM). The volatile memory may be a random access memory (RAM). The memory 550 described in this embodiment of this application is to include any other suitable type of memories.

In some embodiments, the memory 550 may store data to support various operations. Examples of the data include a program, a module, and a data structure, or a subset or a superset thereof, which are described below by using examples.

An operating system 551 includes a system program configured to process various basic system services and perform a hardware-related task, for example, a framework layer, a core library layer, and a driver layer, and is configured to implement various basic services and process a hardware-related task.

A network communication module 552 is configured to reach another computing device through one or more (wired or wireless) network interfaces 520. Exemplary network interfaces 520 include: Bluetooth, wireless compatible authentication (Wi-Fi), a universal serial bus (USB), and the like.

A display module 553 is configured to display information by using an output apparatus 531 (for example, a display screen or a speaker) associated with one or more user interfaces 530 (for example, a user interface configured to operate a peripheral device and display content and information).

An input processing module 554 is configured to detect one or more user inputs or interactions from one of the one or more input apparatuses 532 and translate the detected input or interaction.

In some embodiments, the apparatus for acquiring the position in the virtual scene provided by the embodiment of this application may be implemented by using software. FIG. 2 illustrates an apparatus 555 for acquiring a position in a virtual scene stored in the memory 550. It may be software in a form such as a program or a plug-in, and includes the following software modules: a first presentation module 5551, a control module 5552, and a second presentation module 5553. These modules are logical modules, and may be randomly combined or further divided based on a function to be implemented. The following will describe the function of each module.

In some other embodiments, the apparatus provided in this embodiment of the application may be implemented by using hardware. For example, the apparatus provided in this embodiment of the application may be a processor in a form of a hardware decoding processor, programmed to perform the method for acquiring a position in a virtual scene provided in the embodiments of the application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Figure 3:
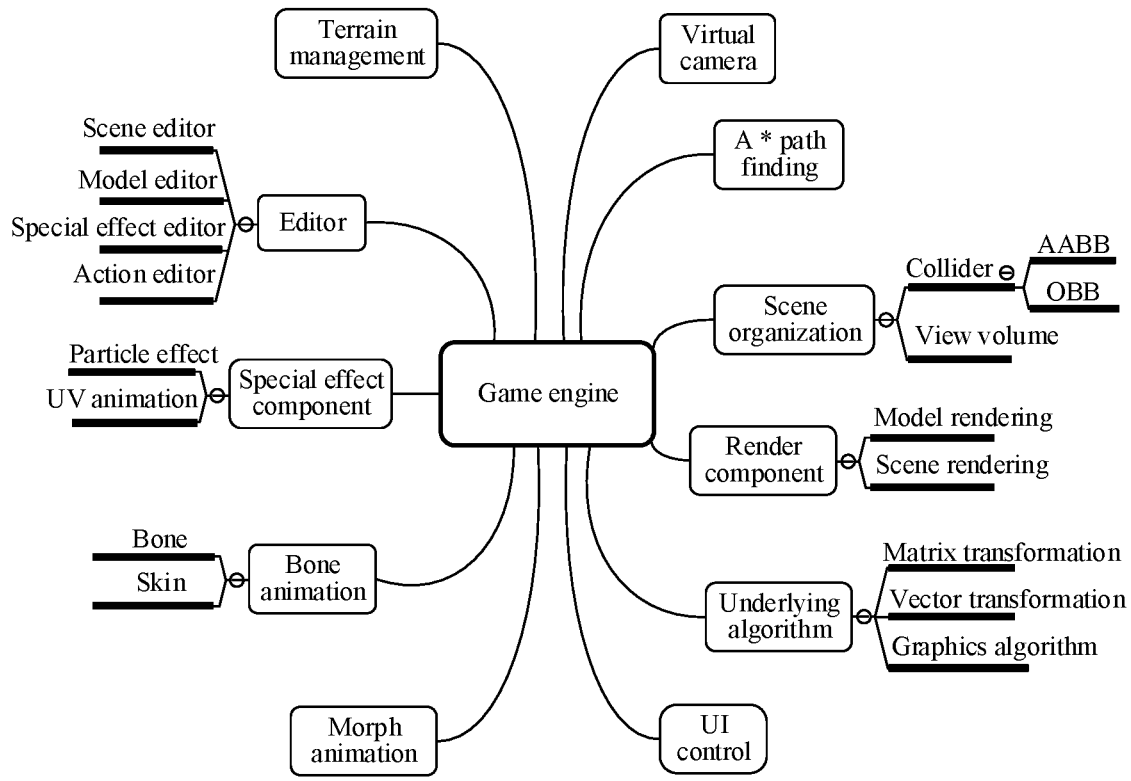
FIG. 3 is a schematic diagram of a human-computer interaction engine in an apparatus for acquiring a position in a virtual scene provided by an embodiment of this application.

In some embodiments, the apparatus 555 for acquiring the position in the virtual scene is installed with a human-computer interaction engine for implementing the method for acquiring the position in the virtual scene. The human-computer interaction engine includes functional modules, components or plug-ins for implementing the method for acquiring the position in the virtual scene. FIG. 3 a schematic diagram of the human-computer interaction engine in the apparatus for acquiring the position in the virtual scene provided by the embodiment of this application. Referring to FIG. 3, that the virtual scene is a game scene is taken as an example. Correspondingly, the human-computer interaction engine is a game engine.

A game engine is a collection of codes or instructions designed for electronic devices that run a certain type of game and can be recognized by the electronic devices. It is used for controlling the operation of a game. A game program can be divided into two parts, including game engine and game resources, namely, game=game engine (program codes)+game resources (images, sounds, animation, etc.). The game resources include images, sounds, animations, etc. The game engine calls these resources in order according to the requirements of the game design.

The method for acquiring the position in the virtual scene provided by the embodiment of this application can be implemented by each module in the apparatus for acquiring the position in the virtual scene in FIG. 2 by calling the relevant modules, components or plug-ins of the game engine in FIG. 3. The modules, components or plug-ins included in the game engine in FIG. 3 will be exemplarily described below.

1) Virtual cameras, a component necessary for the screen of the game scene, are used for the presentation of the screen of the game scene. A game scene corresponds to at least one virtual camera. According to the actual needs, there may be two or more virtual cameras as game rendering windows to capture and present the screen content of the game world for the player. By setting the parameters of the virtual camera, the perspective, such as first-person perspective or third person perspective, of the player viewing the game world can be adjusted.

2) Scene organization is used for game scene management, such as collision detection or visibility elimination. Collision detection can be realized by a collider. According to the actual needs, the collider can be realized by an Axis-Aligned Bounding Box (AABB) or Oriented Bounding Box (OBB). Visibility elimination can be realized based on a view volume. The view volume is a three-dimensional frame generated according to the virtual camera and is used for clipping the objects outside the visual range of the camera. The objects in the view volume will be projected onto the view plane, and the objects not in the view volume will be discarded and not be processed.

3) Terrain management is a component for managing the terrain in the game scene. It is used for creating and editing the game terrain, such as creating the terrain in the game scene such as mountains, valleys and caves.

4) Editors are auxiliary tools in game design and include:
a scene editor, configured to edit the content of the game scene, such as changing the terrain, and customizing vegetation distribution, lighting layout;
a model editor, configured to create and edit a model in a game (a character model in a game scene);
a special effect editor, configured to edit special effects in a game screen;
an action editor, configured to define and edit actions of characters in a game screen.
5) Special effect component is configured to produce and edit game special effects in the game screen. In practical application, particle special effect and texture UV animation may be used for achieving. Particle special effect is to combine countless single particles to make them present a fixed shape, and control their overall or individual motion through controllers and scripts to simulate the effects of water, fire, fog and gas in the real world. UV animation is texture animation realized by dynamically modifying the UV coordinates of the map.
6) Bone animation is realized by using built-in bones to drive objects to generate motion, and can be understood as the following two concepts:
bone: an abstract concept configured to control skin, such as human bones controlling skin;
Skin: factor controlled by bones and displayed outside, such as skin of human body affected by bones.
7) Morph animation, that is, deformation animation, is realized by adjusting the vertices of a base model.
8) UI control is configured to realize the display of the game screen.
9) Underlying algorithm is an algorithm that needs to be called for the realization of the functions in the game engine, such as graphics algorithm needed to realize scene organization, or matrix transformation and vector transformation needed to realize bone animation.
10) Rendering component is a component necessary for the presentation of game screen effects and is configured to convert a scene described by three-dimensional vectors into a scene described by two-dimensional pixels, including model rendering and scene rendering.
11) A* path finding is an algorithm configured to find the shortest path in path planning, path finding and graph traversal in game design.

Next, the method for acquiring the position in the virtual scene provided by the embodiment of this application will be described. In actual implementation, the method for acquiring the position in the virtual scene provided by the embodiment of this application may be implemented by the server or the terminal alone, or by the server and the terminal cooperatively.

Figure 4:
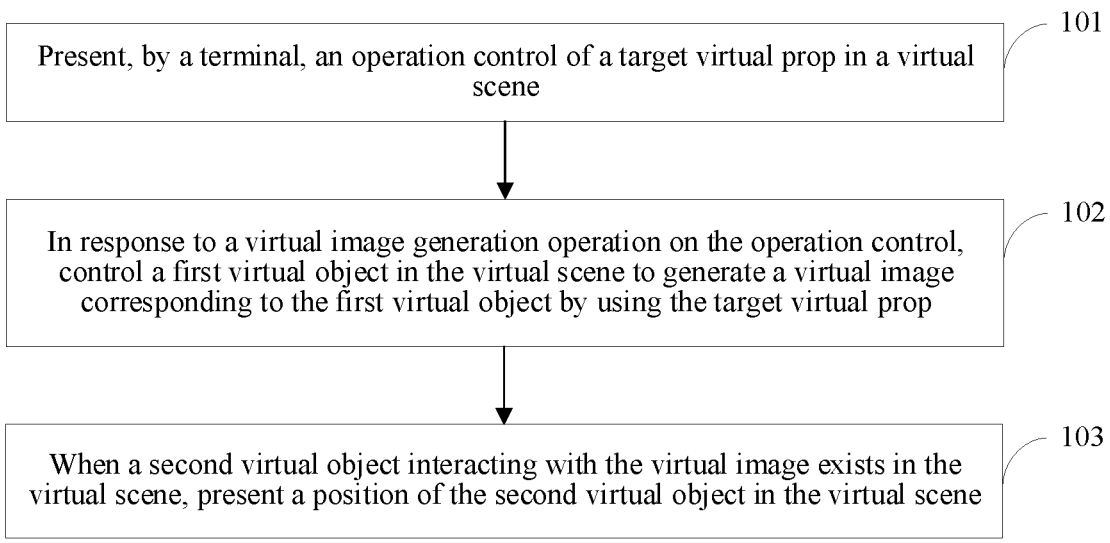
FIG. 4 is a flowchart of a method for acquiring a position in a virtual scene provided by an embodiment of this application.

Referring to FIG. 4, it is a flowchart of the method for acquiring the position in the virtual scene provided by the embodiment of this application. Description will be made in combination with steps illustrated in FIG. 4.

In step 101, a terminal presents an operation control of a target virtual prop in a virtual scene.

In actual application, an application program supporting the virtual scene is installed on the terminal. when the user opens the application program on the terminal and the terminal runs the application program, the terminal acquires scene data of the virtual scene, renders a virtual scene based on the scene data of the virtual scene, and presents an operation control of a target virtual prop in the rendered virtual scene.

Here, the virtual scene can be observed from the perspective of the first-person object, or from the perspective of the third person. In the virtual scene, in addition to presenting the skill control of the target skill, the interaction object and the object interaction environment can also be presented. For example, the first virtual object and the second virtual object that are hostile to each other interact in the virtual scene.

The target virtual prop here is a virtual object that can generate a virtual image corresponding to the first virtual object after being used by the first virtual object, and can present the position of a second virtual object when the second virtual object interacting with the virtual image exists. In actual application, when the terminal has controlled the first virtual object to equip the target virtual prop, the operation control of the target virtual prop that has been taken out from the prop backpack can be presented in the virtual scene. When the first virtual object is not equipped with the target virtual prop, the terminal can control the first virtual object to obtain the target virtual prop through virtual resources or interactive operations, and then present the corresponding operation control in the virtual scene to control the first virtual object to use the target virtual prop through the operation control.

In some embodiments, before the operation control of the target virtual prop is presented in the virtual scene, the terminal can select and equip the target virtual prop according to the following method:

A selection interface including at least one virtual prop is presented in the virtual scene; in response to a selection operation of the virtual prop triggered based on the selection interface, the selected virtual prop is determined as the target virtual prop.

Here, before the terminal presents the virtual scene or during the presentation of the virtual scene, the terminal can present a selection interface for selecting a prop. The selection interface includes at least one virtual prop. The virtual props can be presented in the form of operation control. The operation controls here may be an icon corresponding to the virtual prop or a button corresponding to the virtual prop. The selection interface may be a display interface occupying the entire terminal or part of the entire display interface occupying the terminal. For example, the selection interface may be suspended on the virtual scene. when the user selects the target virtual prop from at least one virtual prop presented on the selection interface, for example, the user triggers the operation control of the target virtual prop, the target virtual prop can be presented in the virtual scene.

In actual implementation, in response to receiving the selection operation of the virtual prop triggered by the selection interface, the terminal can display the selected virtual prop and the equipment function item corresponding to the selected virtual prop in a display style different from other virtual props, such as highlighting the selected virtual prop. Here, the function introduction information of the target virtual prop can be presented while highlighting the selected virtual prop. when the user triggers the equipment function item, the terminal determines the selected virtual prop as the target virtual prop, controls the first virtual object to equip the target virtual prop into the prop backpack, and presents the operation control of the target virtual prop in the virtual prop column in the virtual scene. when the user triggers the operation control of the target virtual prop in the virtual prop column, the terminal controls the first virtual object to take out the target virtual prop from the prop backpack for use in response to the trigger operation, and presents the operation control of the target virtual prop in the virtual scene.

Figure 5:
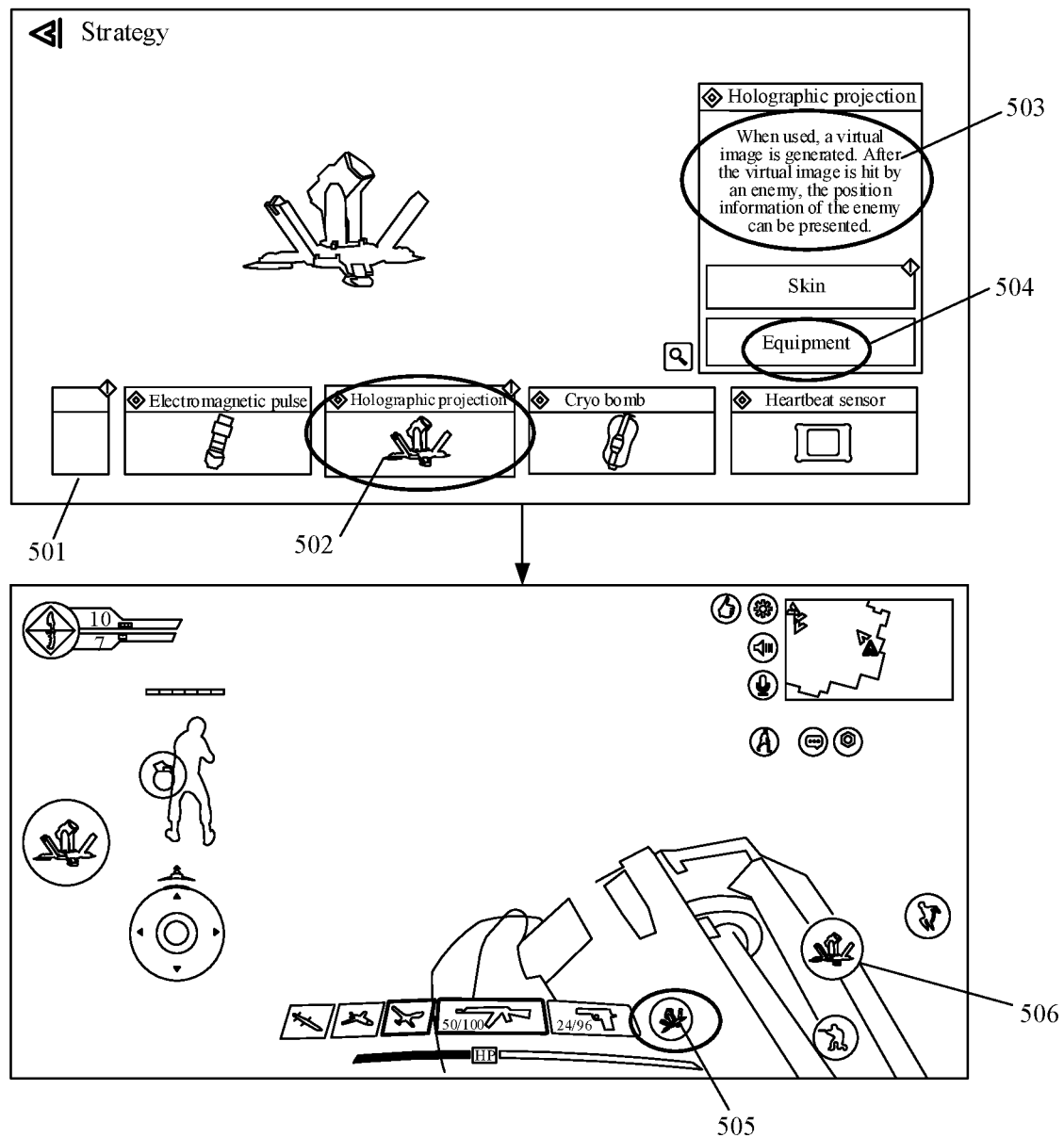
FIG. 5 is a schematic diagram of a virtual prop display interface provided by an embodiment of this application.

Referring to FIG. 5, it is a schematic diagram of a virtual prop display interface provided by the embodiment of this application, when the user triggers the operation control 502 of the virtual prop in the virtual prop selection interface 501 illustrated in FIG. 5, the selected operation control 502 is displayed in a highlighted display style, and the introduction information 503 of the virtual prop corresponding to the operation control 502 is presented. After the user clicks the equipment function item 504, the terminal determines the virtual prop corresponding to the operation control 502 as the target virtual prop, and presents the operation control 505 of the target virtual prop in the virtual prop column. when the user triggers the operation control 505, the terminal controls the first virtual object to take out the target virtual prop from the prop backpack for use, and presents the operation control 506 of the target virtual prop in the virtual scene.

In step 102, in response to a virtual image generation operation on the operation control, a first virtual object in the virtual scene is controlled to generate a virtual image corresponding to the first virtual object by using the target virtual prop.

Here, when the user triggers the operation control of the target virtual prop, the terminal receives a virtual image generation operation, and controls a first virtual object to generate a virtual image corresponding to the first virtual object by using the target virtual prop in response to the virtual image generation operation.

Figure 6:
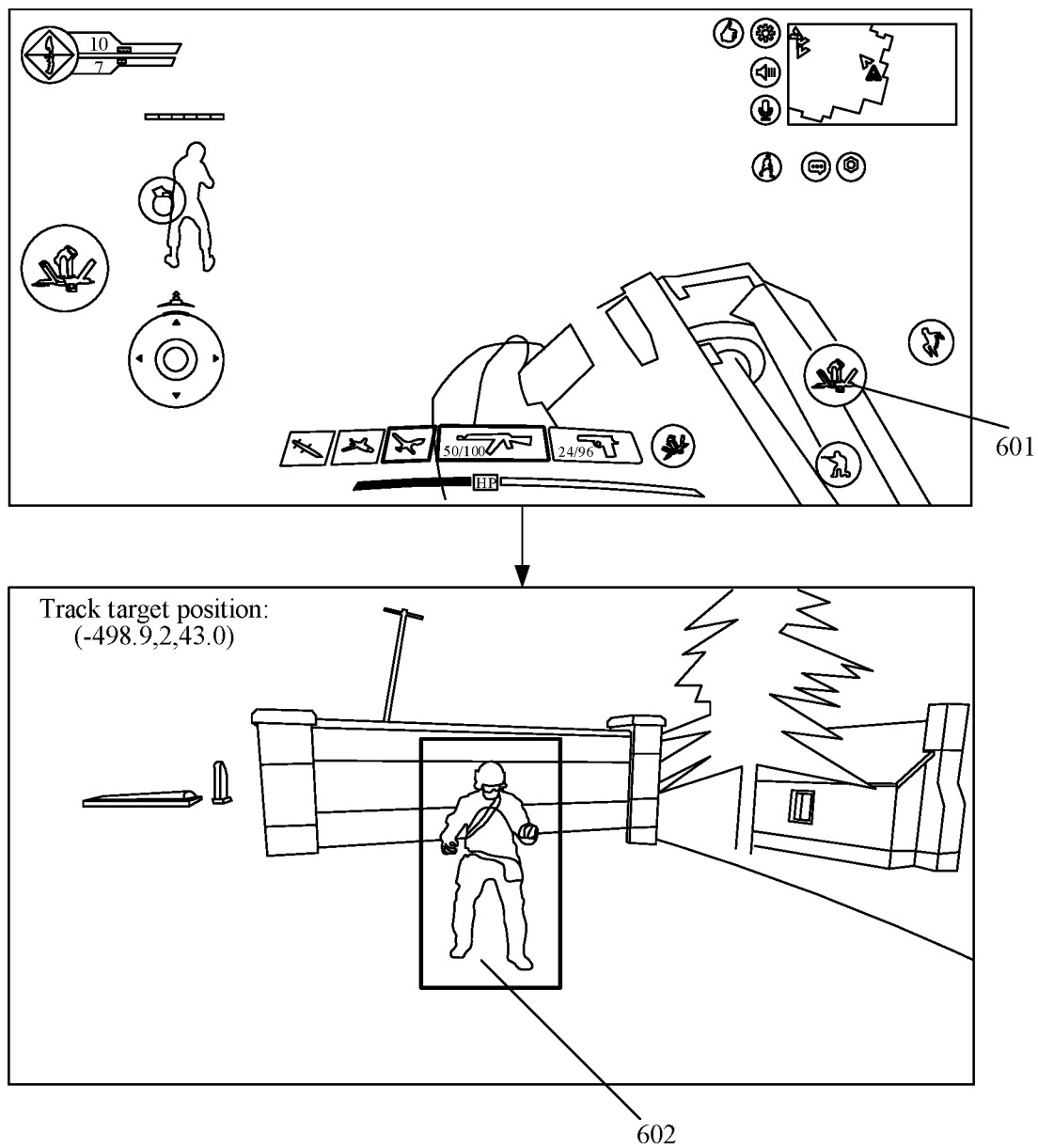
FIG. 6 is a schematic diagram of a virtual prop use interface provided by an embodiment of this application.

Referring to FIG. 6, it is a schematic diagram of a virtual prop use interface provided by the embodiment of this application, when the user triggers the operation control 601 of the target virtual prop illustrated in FIG. 6, the terminal controls the first virtual object to use the target virtual prop in response to the trigger operation, and generates a virtual image 602 corresponding to the first virtual object.

In some embodiments, the terminal may control the first virtual object to generate a virtual image corresponding to the first virtual object in the virtual scene by using the target virtual prop according to the following method:
when the target virtual prop is a throwing type prop, a target position is presented in the virtual scene, and the first virtual object is controlled to throw the target virtual prop to the target position; when the target virtual prop falls onto the target position, a virtual image corresponding to the first virtual object is generated at the target position.

Here, when the target virtual prop is a throwing type prop such as grenade or bomb, and when the user triggers the operation control of the target virtual prop, the terminal presents the target position (i.e., the landing place) where the target virtual prop is to be thrown, controls the first virtual object to throw the target virtual prop to the target position, generates a virtual 1:1 holographic projection of the first virtual object at the target position, that is, a virtual image. In the virtual scene from the enemy's perspective, the virtual projection is consistent with the first virtual object using the target virtual prop.

Figure 7:
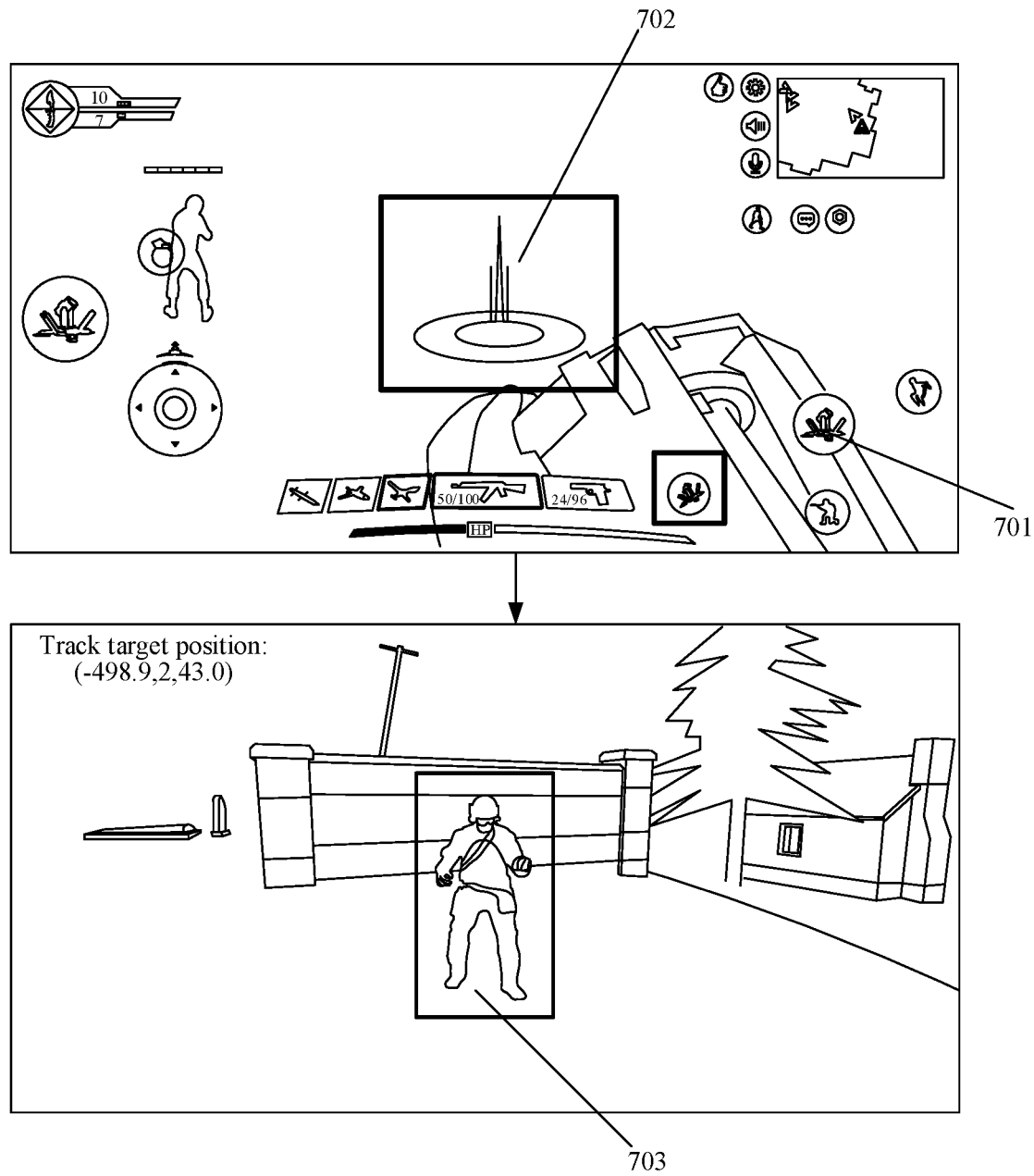
FIG. 7 is a schematic diagram of a virtual prop use interface provided by an embodiment of this application.

Referring to FIG. 7, it is a schematic diagram of the virtual prop use interface provided by the embodiment of this application. When the user clicks the operation control 701 of the target virtual prop illustrated in FIG. 7, the terminal displays the target position 702 where the target virtual prop is to be thrown in response to the click operation, and controls the first virtual object to throw the target virtual prop to the target position 702. when the click operation is released, the process that the target virtual prop falls onto the target position 702 is presented. After the target virtual object falls onto the target position 702, a virtual image 703 corresponding to the first virtual object is generated at the target position 702.

In some embodiments, the terminal may also control the first virtual object to generate a virtual image corresponding to the first virtual object in the virtual scene by using the target virtual prop according to the following method:
when the target virtual prop is a throwing type prop, a throwing trajectory is presented in the virtual scene, and the first virtual object is controlled to throw the target virtual prop along the throwing trajectory; when the target virtual prop moves to the target position along the throwing trajectory, a virtual image corresponding to the first virtual object is generated at the target position.

Here, the throwing trajectory is determined based on the position of the first virtual object in the virtual scene and the target position randomly selected from the virtual scene. Alternatively, the terminal acquires the throwing point and the throwing speed that the first virtual object throws the target virtual prop, determines the throwing trajectory based on the throwing point and the throwing speed, and takes the end position of the throwing trajectory as the target position.

Figure 8A:
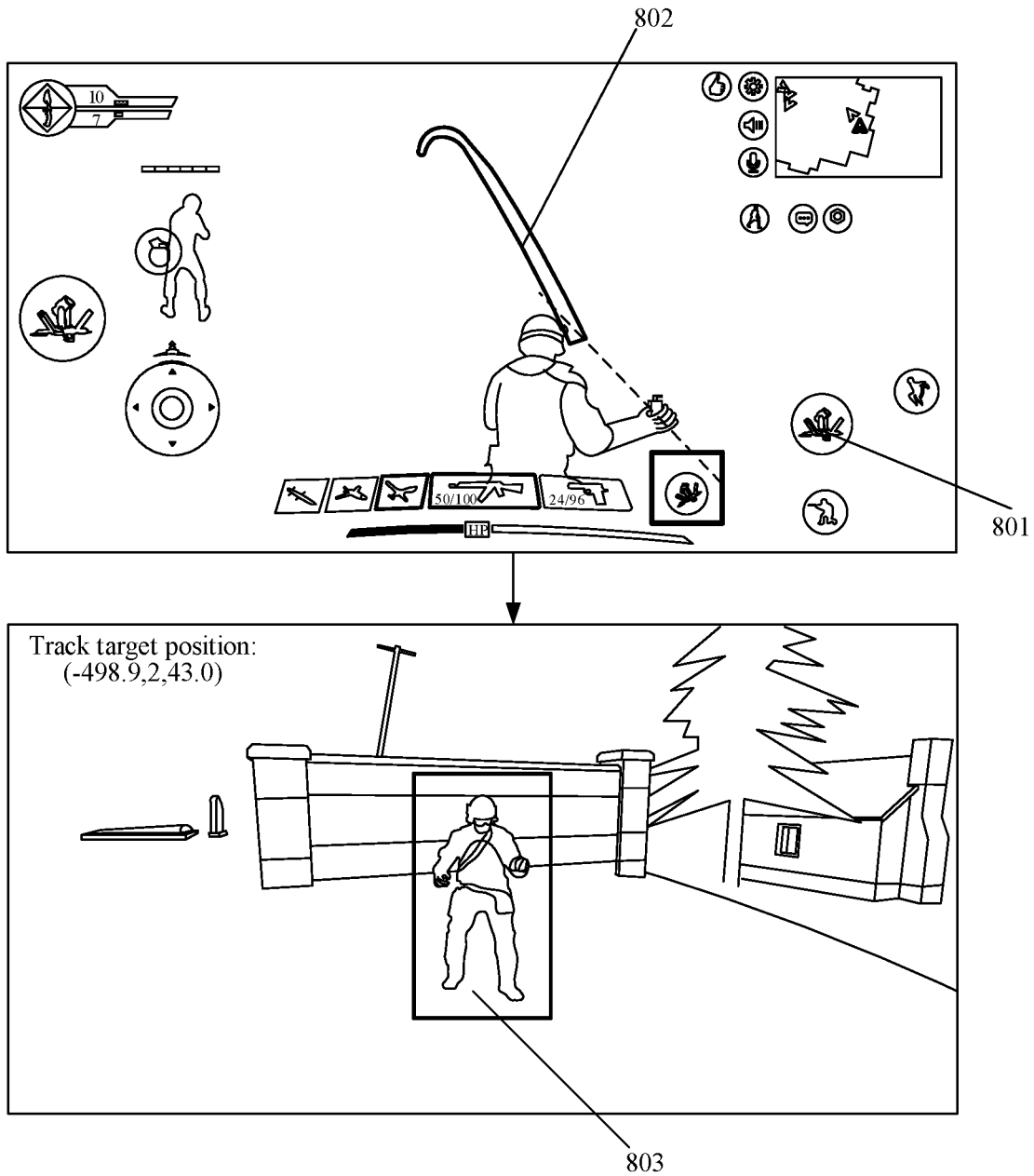
FIG. 8A is a schematic diagram of a virtual prop use interface provided by an embodiment of this application.

Referring to FIG. 8A, it is a schematic diagram of a virtual prop use interface provided by the embodiment of this application, when the user clicks the operation control 801 of the target virtual prop illustrated in FIG. 8A, the terminal presents a throwing trajectory 802. and controls the first virtual object to throw the target virtual prop along the throwing trajectory 802. when the click operation is released, the process that the target virtual prop falls onto the target position is presented, when the target virtual object falls onto the target position, a virtual image 803 corresponding to the first virtual object is generated at the target position.

Figure 8B:
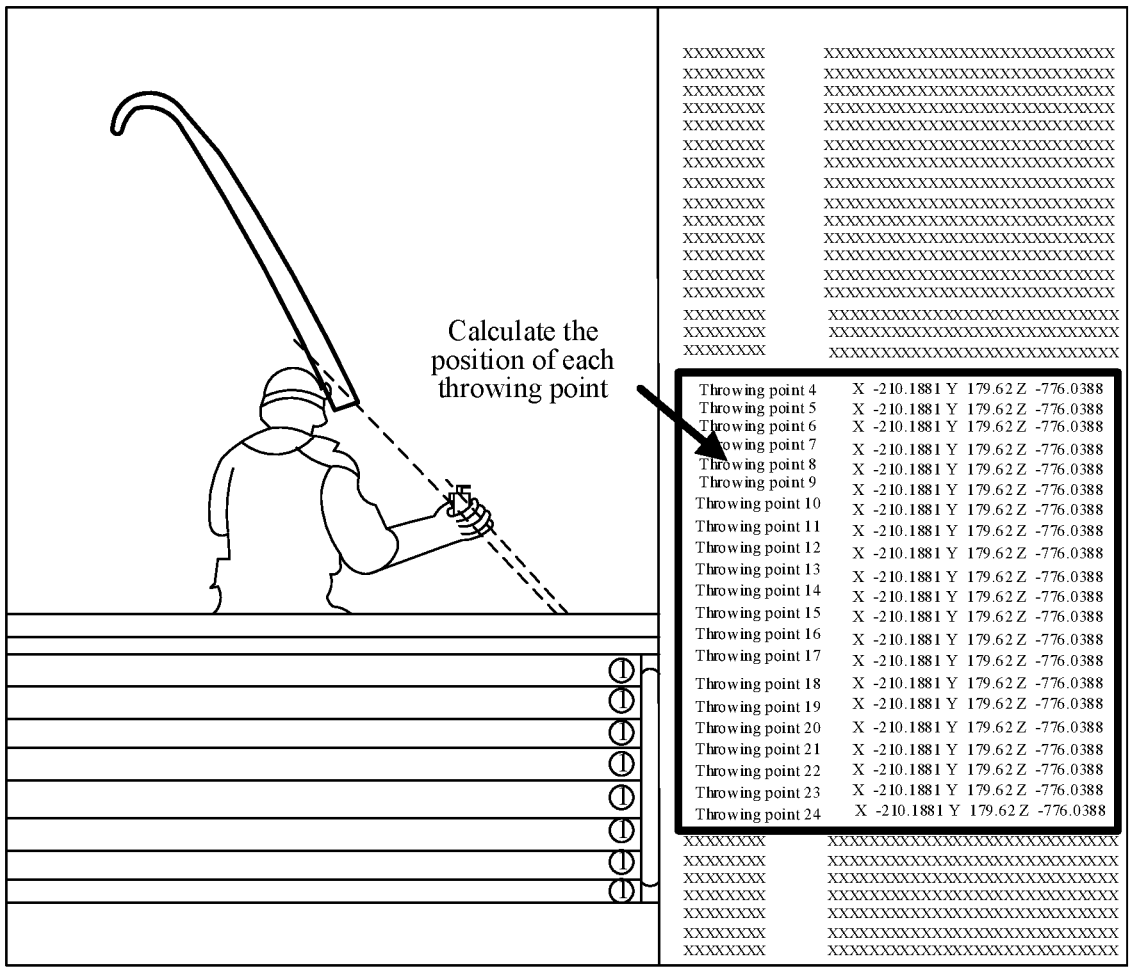
FIG. 8B is a schematic diagram of a throwing trajectory generation interface provided by an embodiment of this application.

In actual implementation, referring to FIG. 8B, which is a schematic diagram of a throwing trajectory generation interface provided by the embodiment of this application, when the user clicks the operation control of the target virtual prop and does not release the click operation, the terminal acquires the throwing point and the throwing speed that the first virtual object throws the target virtual prop and then determines a throwing trajectory within one frame. In actual implementation, the throwing trajectory can be determined according to the following method: a plurality of throwing points corresponding to the throwing trajectory are acquired, special effects are used for performing line rendering to each throwing point to obtain a corresponding parabola, and the parabola is used as the throwing trajectory. The distance between adjacent throwing points can be set according to the actual situation. For example, the distance between two adjacent throwing points is set to 0.1 m.

In some embodiments, the terminal may also control the first virtual object to generate a virtual image corresponding to the first virtual object in the virtual scene by using the target virtual prop according to the following method:
when the target virtual prop is a firing type prop, the first virtual object is controlled to use the target virtual prop to fire a sub virtual prop to the target position; when the sub virtual object falls onto the target position, a virtual image corresponding to the first virtual object is generated at the target position.

Here, when the target virtual prop is a firing type virtual prop such as a gun or a crossbow; a sub virtual prop is a virtual prop corresponding to the target virtual prop. For example, when the target virtual prop is a gun type virtual prop, the sub virtual prop is a corresponding virtual bullet;

when the target virtual prop is a crossbow virtual prop, the sub virtual prop may be a corresponding virtual bow and arrow. Before the first virtual object is controlled to use the target virtual prop to fire the sub virtual prop, the first virtual object is controlled to use the target virtual prop to aim at a firing action point, i.e., the target position. After the target position is aimed at, the first virtual object is controlled to use the target virtual prop to fire a sub virtual prop to the target position, and when the sub virtual prop falls onto the target position, a virtual image corresponding to the first virtual object is generated at the target position.

Figure 9:
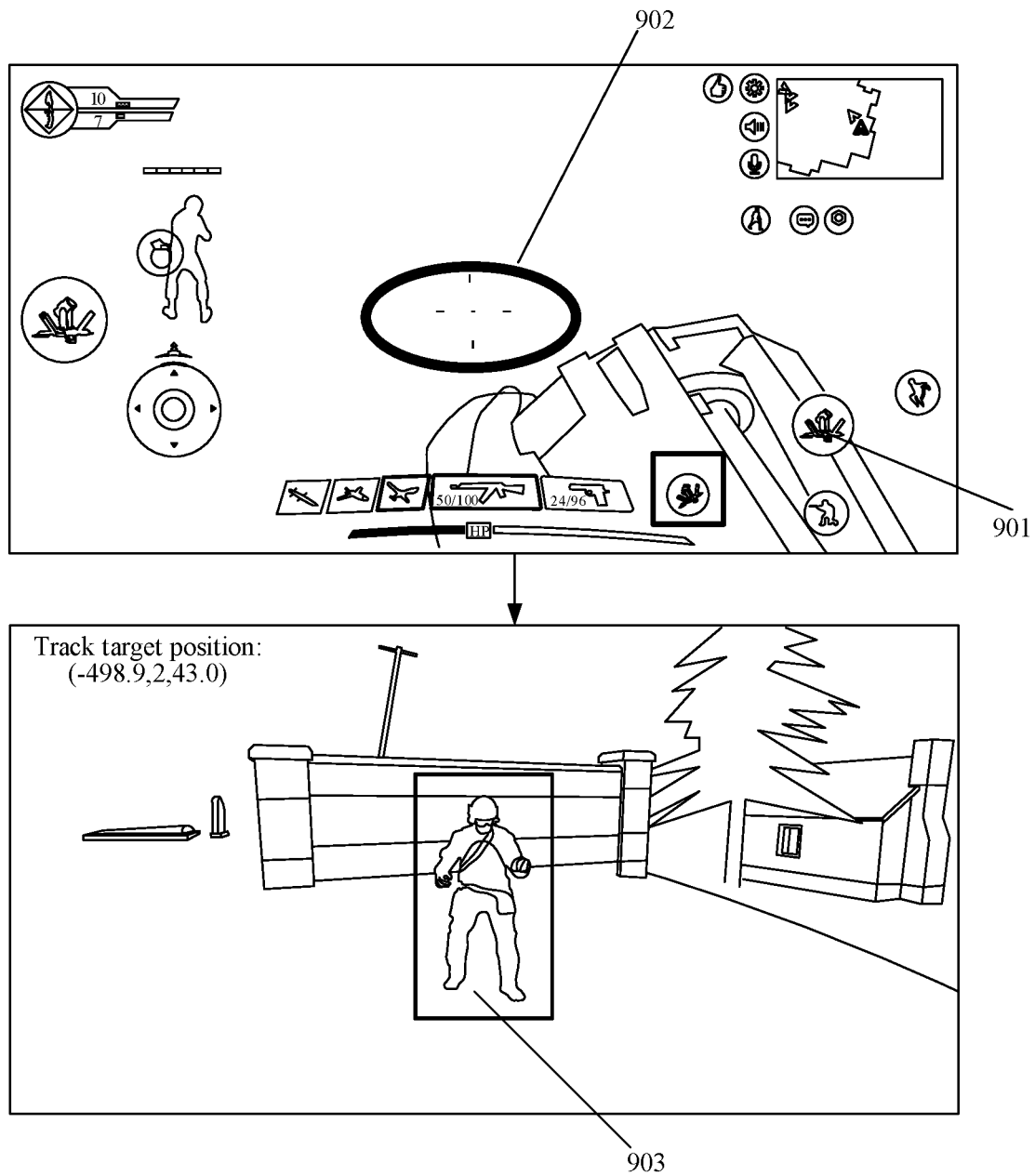
FIG. 9 is a schematic diagram of a virtual prop use interface provided by an embodiment of this application.

Referring to FIG. 9, which is a schematic diagram of a virtual prop use interface provided by the embodiment of this application, when the user clicks the operation control 901 of the target virtual prop illustrated in FIG. 9, the terminal controls the first virtual object to aim at the target position 902 by using the target virtual prop; when the click operation is released, the process that the target virtual prop falls onto the target position 902 is presented, A virtual image 903 corresponding to the first virtual object is generated at the target position 902.

In some embodiments, the terminal may also control the first virtual object to generate a virtual image corresponding to the first virtual object in the virtual scene by using the target virtual prop according to the following method:

when the target virtual prop is a placing type prop, the first virtual object in the virtual scene is controlled to place the target virtual prop at the target position; based on the target position, when a virtual image generation condition is satisfied, a virtual image corresponding to the first virtual object is generated at the target position.

Here, when the target virtual prop is a placing type prop such as mine or grass clamp, in general, after the terminal controls the first virtual object to place the target virtual prop at the target position, when an effective condition of the target virtual prop (i.e., virtual image generation condition) is satisfied, the virtual image generation condition may be determined according to the actual situation. For example, whether the virtual image generation condition is satisfied is determined by determining whether a virtual image generation instruction is received, or whether the virtual image generation condition is satisfied is determined by obtaining the placement time length of the target virtual prop to the target position and determining whether the placement time length reaches a time length threshold. When the virtual image generation instruction is received or the placement time length of the target virtual prop to the target position reaches the time length threshold, it is considered that the virtual image generation condition is satisfied. In this case, the target virtual object can be controlled to act at the target position. For example, a virtual image corresponding to the first virtual object is generated at the target position.

Figure 10:
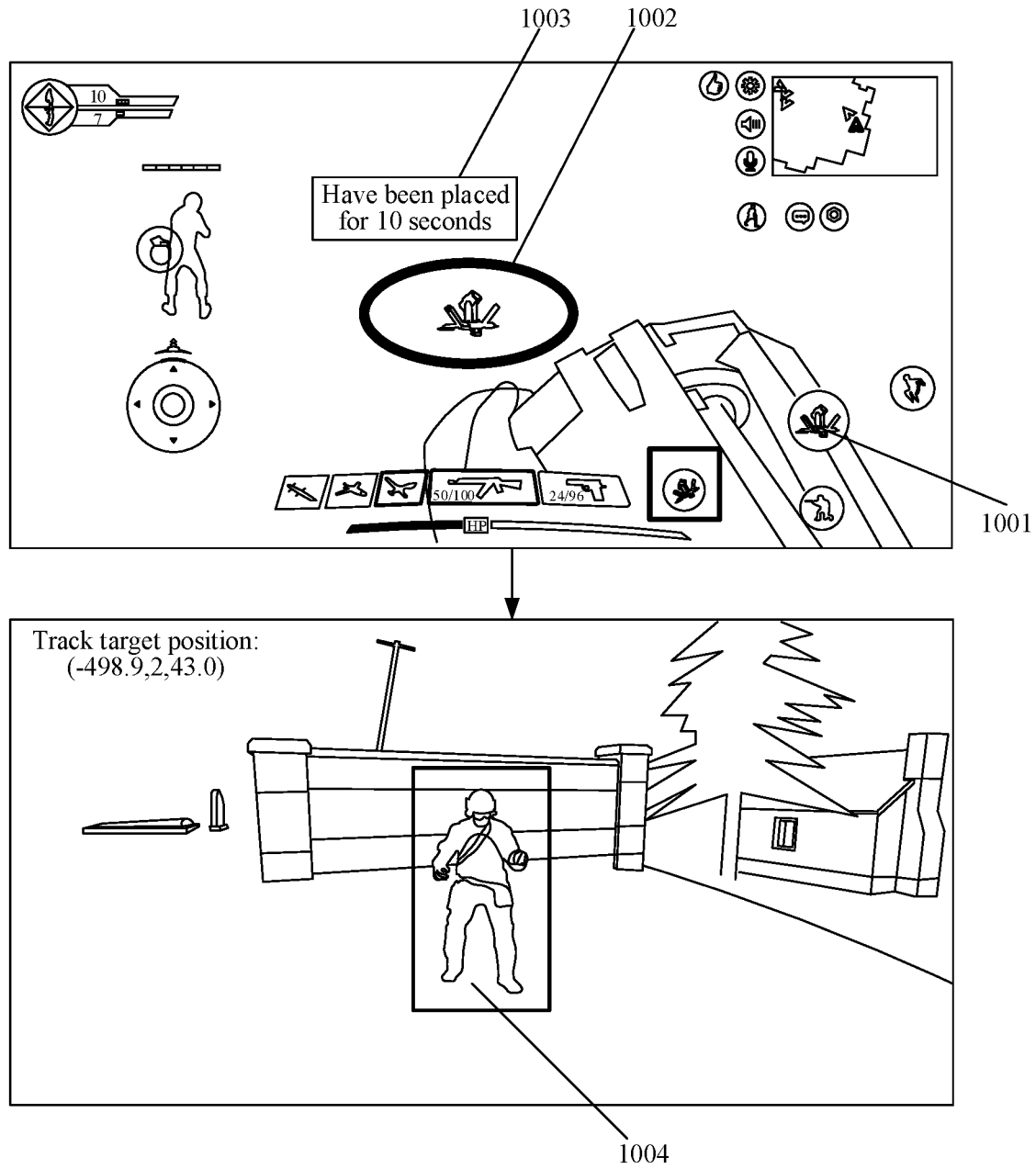
FIG. 10 is a schematic diagram of a virtual prop use interface provided by an embodiment of this application.

Referring to FIG. 10, which is a schematic diagram of a virtual prop use interface provided by the embodiment of this application, when the user clicks the operation control 1001 of the target virtual prop illustrated in FIG. 10, the terminal controls the first virtual object to place the target virtual prop to the target position 1002; when the placement time length 1003 reaches a time threshold, a virtual image 1004 corresponding to the first virtual object is generated at the target position 1002.

In step 103, when a second virtual object interacting with the virtual image exists in the virtual scene, a position of the second virtual object in the virtual scene is presented.

Here, the second virtual object is an object interacting with the first virtual object in the virtual scene, the first virtual object is a virtual object in the virtual scene corresponding to the current login account, and the second virtual object is a virtual object in the virtual scene corresponding to another login account different from the current login account. The two are hostile to each other. when the virtual image corresponding to the first virtual object is attacked by the second virtual object, that is, when a second virtual object interacting with the virtual image exists, the position of the second virtual object in the virtual scene can be exposed.

In some embodiments, before the position of the second virtual object in the virtual scene is presented, the terminal can determine whether a second virtual object interacting with the virtual image in the virtual scene exists according to the following method:

when a second virtual object using the interactive virtual prop exists in the virtual scene, a detection ray consistent with the interaction direction of the interactive virtual prop and an interaction detection frame corresponding to the virtual image are acquired; crossing detection is performed the detection ray and the interaction detection frame to obtain a detection result; when the detection result indicates that the detection ray crosses the interaction detection frame, it is determined that a second virtual object interacting with the virtual image exists in the virtual scene.

In actual implementation, through the camera component bound to the interactive virtual prop (such as virtual shooting prop) used by the second virtual object, a detection ray consistent with the interaction direction (such as direction or aiming direction) of the interactive virtual prop is emitted from a shooting port (such as virtual muzzle) of the interactive virtual prop, and the virtual image is hung with a corresponding interaction detection frame (such as collision box, collision ball and other collider components). The interaction detection frame is located around the virtual image, that is, the interaction detection frame wraps the virtual image. Whether the interactive virtual prop used by the second virtual object has hit the virtual image is determined according to the crossing detection result between the detection ray and the interaction detection frame. When the detection ray crosses the interaction detection frame, it indicates that the interactive virtual prop used by the second virtual object has successfully hit the virtual image, that is, the second virtual object interacting with the virtual image exists; when the detection ray does not cross the interaction detection frame, it indicates that the interactive virtual prop used by the second virtual object has not successfully hit the virtual image, that is, the second virtual object interacting with the virtual image does not exist.

Figure 11:
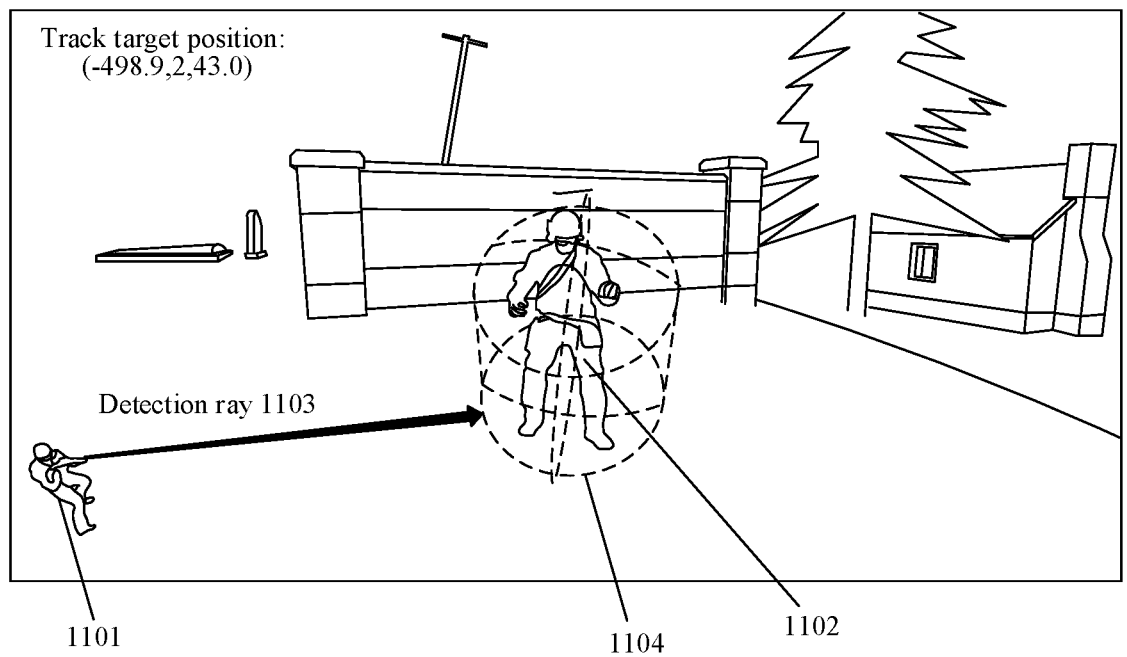
FIG. 11 is a schematic diagram of interaction detection provided by an embodiment of this application.

Referring to FIG. 11, it is a schematic diagram of interaction detection provided by the embodiment of this application. As illustrated in FIG. 11, when the second virtual object 1101 uses the interactive virtual prop to interact in the virtual scene, e.g., attack the virtual image 1102, crossing detection is performed to the detection ray 1103 emitted from the shooting port of the interactive virtual prop and the interaction detection frame 1104 surrounding the virtual image 1102; when the detection ray 1103 crosses the interaction detection frame 1104, it indicates that the second virtual object 1101 interacting with the virtual image 1102 exists in the virtual scene; when the detection ray 1103 does not cross the interaction detection frame 1104, it indicates that no second virtual object 1101 interacting with the virtual image 1102 exists in the virtual scene.

In some embodiments, before the position of the second virtual object in the virtual scene is presented, the terminal may output the interaction prompt information of the second virtual object and the virtual image by outputting image interaction prompt information. The image interaction prompt information is used for prompting the existence of the second virtual object interacting with the virtual image.

In actual implementation, the terminal may output the image interaction prompt information by presenting the image interaction prompt information indicating that the second virtual object interacting with the virtual image exists; or, playing a media file indicating that a second virtual object interacting with the virtual image exists. The media file includes at least one of a background audio file and a background animation file.

The image interaction prompt information is used for prompting the first virtual object that a second virtual object interacting with the virtual image exists in the virtual scene, so that the first virtual object can enhance vigilance based on the image interaction prompt information and timely acquire the position information of the second virtual object for strategic layout.

For example, when a second virtual object interacting with the virtual image exists, image interaction prompt information "Be vigilant! The target has already appeared!" or "Please note that the target is approaching!" is presented. In another example, when a second virtual object interacting with the virtual image exists, a background music file such as "Dididi . . . " or "Dongdongdong . . . " that indicates that the second virtual object has appeared, is played; or an animation such as "Jump", "Tension" that indicates that the second virtual object has appeared, is played, etc.

In some embodiments, the position of the second virtual object in the virtual scene may be presented according to the following method:
  a map thumbnail of the virtual scene is presented. The position of the second virtual object in the virtual scene is presented in the map thumbnail. The position is the position of the second virtual object in the virtual scene when the second virtual object interacts with the virtual image.

Here, when a second virtual object interacting with the virtual image exists, for example, when the virtual image is hit by a virtual bullet fired by the second virtual object, the firing position that the second virtual object fires the virtual bullet is presented in the map thumbnail.

Figure 12:
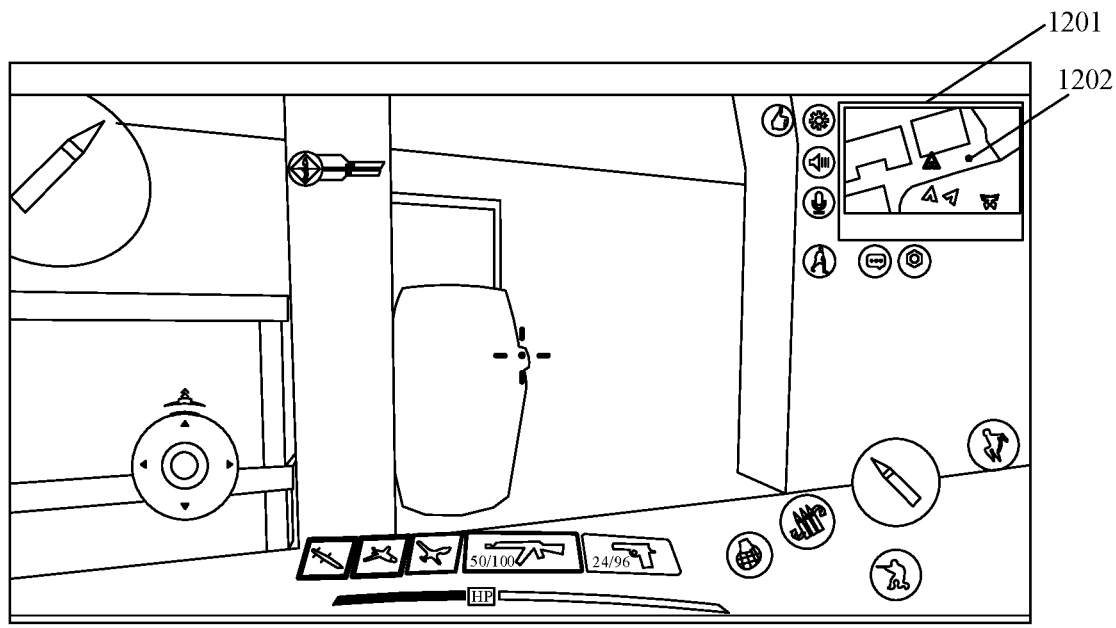
FIG. 12 is a schematic diagram of position display provided by an embodiment of this application.

Referring to FIG. 12, which is a schematic diagram of position display provided by the embodiment of this application, when the virtual image is hit by the virtual bullet fired by the second virtual object, a red dot, that is, the firing position 1202 that the second virtual object fires the virtual bullet, is presented in the map thumbnail 1201.

In some embodiments, during the movement of the second virtual object in the virtual scene, the terminal may present the position of the second virtual object according to the following method:
  when the second virtual object does not interact with the virtual image, the position presented in the map thumbnail is maintained unchanged; when the second virtual object continues to interact with the virtual image, the position presented in the map thumbnail is updated.

Here, after the second virtual object interacts with the virtual image, the second virtual object can move in the virtual scene. During the movement of the second virtual object in the virtual scene, when the second virtual object does not continue to interact with the virtual image, a shooting position 1202 indicating the second virtual object in the map thumbnail 1201 illustrated in FIG. 12 will not be refreshed at the same time. when the second virtual object continues to interact with the virtual image, the shooting position 1202 indicating the second virtual object in the map thumbnail 1201 illustrated in FIG. 12 will be refreshed synchronously with each interaction. In this way, the position presented in the map thumbnail is only the firing position when the second virtual object interacts with the virtual image, so as to avoid exposing the position of the second virtual object too much and affecting the ecological balance between the first virtual object and the second virtual object, to effectively control the functional strength of the target virtual prop, and to help maintain the interaction balance in the virtual scene.

Of course, in some embodiments, after the second virtual object interacts with the virtual image, during the movement of the second virtual object in the virtual scene, the movement position of the second virtual object may also be presented in the map thumbnail, that is, the movement position of the second virtual object may be synchronously updated in the map thumbnail, regardless of whether the second virtual object continues to interact with the virtual image, In the map thumbnail 1201 illustrated in FIG. 12, the shooting position 1202 indicating the second virtual object is synchronously refreshed with the movement of the second virtual object. In this way, once the virtual image generated based on the target virtual prop is hit by the second virtual object, the position of the second virtual object in the virtual scene is updated in the map thumbnail in real time, which helps the first virtual object to control the battle situation, quickly end the interaction with the second virtual object, and improve the interaction efficiency.

In some embodiments, the terminal may present the position of the second virtual object in the virtual scene by presenting the position of a target number of second virtual objects of at least two second virtual objects in the virtual scene when the number of the second virtual objects is at least two.

Here, when the virtual image is shot simultaneously by a plurality of second virtual objects for a period of time, only the shooting position of the first virtual object that hits the virtual image may be presented, or the shooting positions of all or part of the second virtual objects that hit the virtual image may be presented. In addition, the shooting positions of the second virtual objects causing a high degree of harm to the first virtual object may be presented according to the degree of harm caused by the second virtual objects to the first virtual object, so that the first virtual object can eliminate the second virtual objects with a high degree of harm as soon as possible. In practical application, there may also be a time limit for the position presentation of the second virtual object, that is, the position of the second virtual object when shooting the virtual image can only present target time length (e.g., 10 seconds). when the target time length is reached, the presentation of the position of the second virtual object when shooting the virtual image is canceled.

In some embodiments, the terminal may present the position of the second virtual object in the virtual scene according to the following method:
  an interaction position of the second virtual object in the virtual scene is acquired when the second virtual object interacts with the virtual image; in the virtual scene, the second virtual object at the interaction position is presented in a perspective view of the virtual scene, so that the second virtual object is in a visible state relative to the first virtual object.

The perspective presentation of the second virtual object at the interaction position means that even if there is an obstacle between the first virtual object and the second virtual object that makes each other invisible, or the second virtual object is located at a position that is invisible relative to the first virtual object, the first virtual object can see the second virtual object, but the second virtual object cannot see the first virtual object. Thus, the perspective presentation of the second virtual object in the virtual scene helps the first virtual object to accurately attack the second virtual object.

Figure 13:
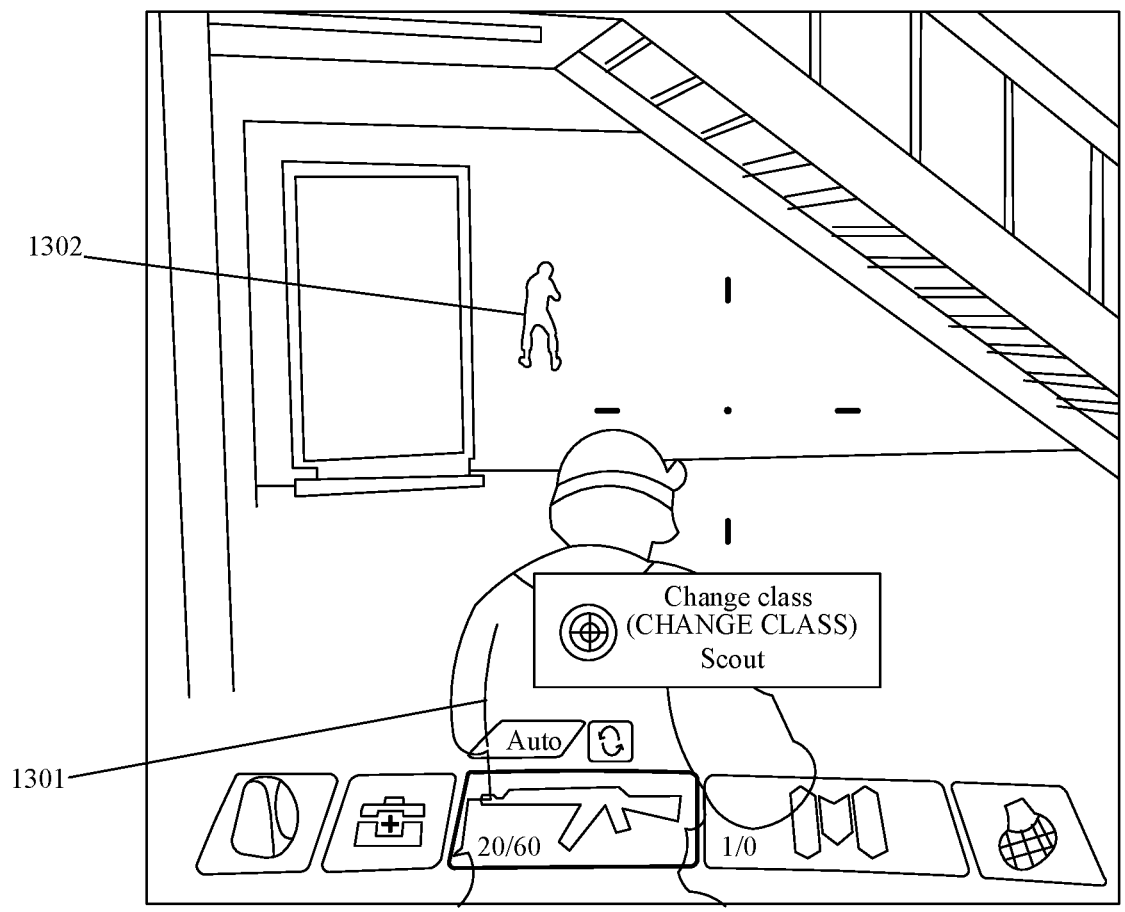
FIG. 13 is a schematic diagram of position display provided by an embodiment of this application.

Referring to FIG. 13, which is a schematic diagram of position display provided by the embodiment of this application, when the virtual image of the first virtual object 1301 is hit by the virtual bullet fired by the second virtual object, the shooting position of the second virtual object when the second virtual object fires the virtual bullet is acquired, and the second virtual object 1302 located at the shooting position is presented in a perspective view of the virtual scene from the perspective of the first virtual object 1301.

In some embodiments, the terminal may also present a perspective presentation countdown corresponding to the second virtual object; when the perspective presentation countdown is reset to zero, the perspective presentation of the second virtual object at the interaction position is canceled.

In some embodiments, the terminal may also acquire and present the perspective presentation time length corresponding to the second virtual object; when the perspective presentation time length reaches the target time length, the perspective presentation of the second virtual object at the interaction position is canceled in the virtual scene.

Figure 14:
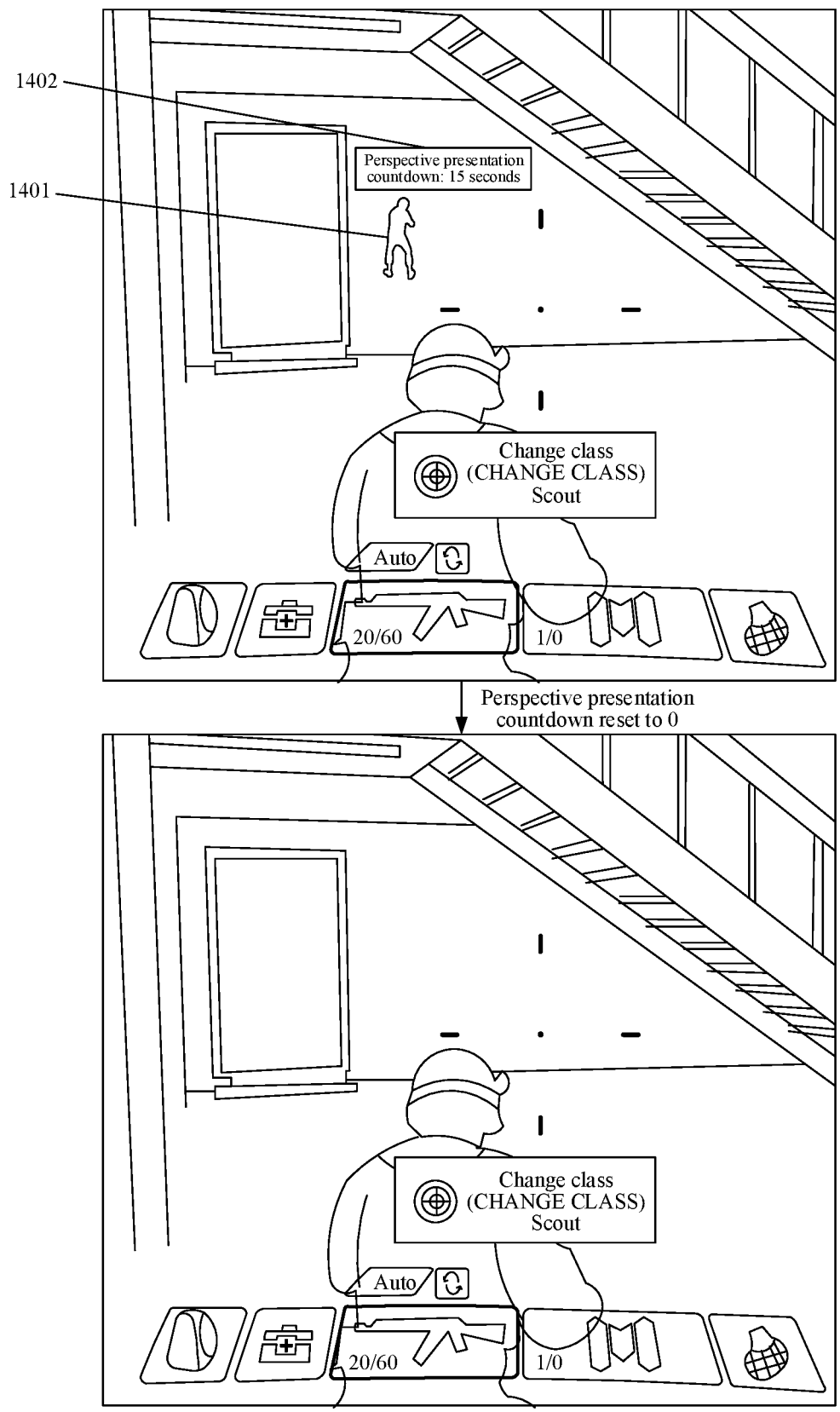
FIG. 14 is a schematic diagram of position display provided by an embodiment of this application.

Referring to FIG. 14, it is a schematic diagram of position display provided by the embodiment of this application. The second virtual object 1401 is presented in a perspective view; and the perspective presentation countdown 1402 corresponding to the second virtual object is presented. when the perspective presentation countdown 1402 is reset to zero, the perspective presentation of the second virtual object at the interaction position is canceled. In this way, by limiting the perspective presentation time length of the second virtual object, the player can be encouraged to seize the opportunity to control the first virtual object to perform interaction operations with respect to the second virtual object based on the perspectively presented position of the second virtual object, so as to obtain greater advantages, adjust the interaction initiative and improve the interaction experience.

According to this application, an operation control of a target virtual prop is presented in a screen of a virtual scene, and in response to a virtual image generation operation on the operation control, a first virtual object in the virtual scene is controlled to generate a virtual image corresponding to the first virtual object by using the target virtual prop; when a second virtual object interacting with the virtual image exists in the virtual scene, a position of the second virtual object is presented in the virtual scene. It can be seen that in the embodiments of this application, the position of the second virtual object can be determined as long as the second virtual object interacting with the virtual image exists in the virtual scene. That is, in the embodiments of this application, after the virtual image is generated by using the target virtual prop, whether a second virtual object interacting with the virtual image is determined. In response to determine that a second virtual object interacting with the virtual image exists, the position of the second virtual object in the virtual scene can be acquired, so that the first virtual object can make a corresponding strategic layout. Compared with other methods in which multiple interactions with other virtual objects need to be performed to acquire the position of the virtual object, the method for acquiring the position in the virtual scene provided by the embodiments of this application does not require the first virtual object to perform multiple interactive operations with other virtual objects, the acquisition efficiency of the position information is high, and the human-computer interaction efficiency is improved.

Figure 15:
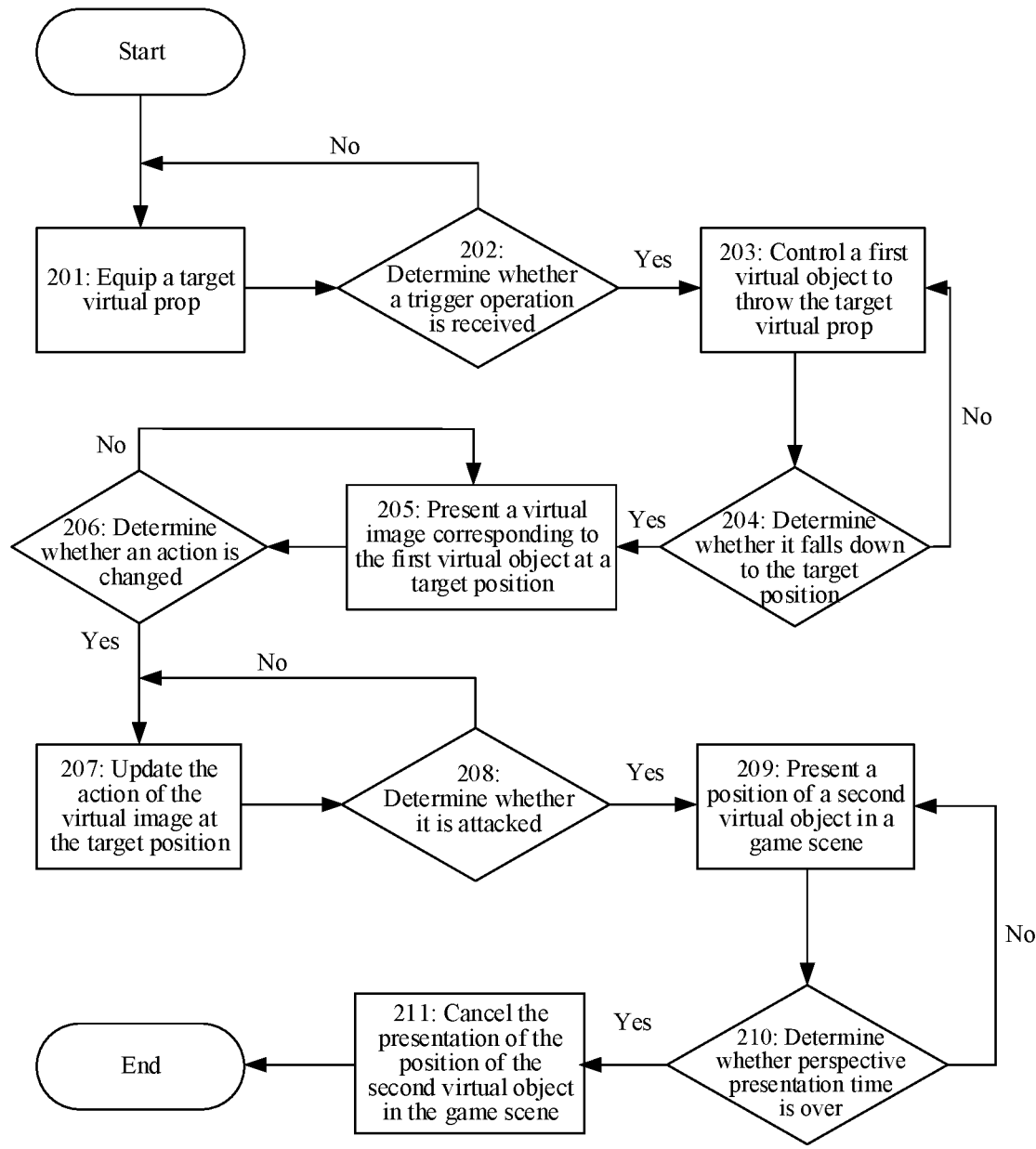
FIG. 15 is a flowchart of a method for acquiring a position in a virtual scene provided by an embodiment of this application.

The following describes an exemplary application of this embodiment of this application in an actual application scenario. Taking that the virtual scene is a shooting game as an example, referring to FIG. 15, it is a flowchart of the method for acquiring the position in the virtual scene provided by the embodiment of this application. Description will be made in combination with steps illustrated in FIG. 15.

In step 201, the terminal controls the first virtual object to equip the target virtual prop.

Here, the target virtual prop is also called a holographic projection prop, Specifically, it is a virtual prop that can generate a virtual image corresponding to the first virtual object after being used by the first virtual object, and present the position of the second virtual object when the second virtual object interacting with the virtual image exists. The target virtual prop is a passively triggered props, that is, after the target virtual prop is thrown, it cannot take effect actively and need to be hit by other articles or objects to produce the above effect.

In step 202, whether an operation for the target virtual prop is received is determined.

Here, when the terminal has received the operation for the target virtual prop, step 203 is executed. Otherwise, step 201 is executed.

In step 203, the first virtual object is controlled to throw the target virtual prop.

Here, when the terminal detects the user's click operation on the operation control of the target virtual prop, the terminal controls the first virtual object to throw the target virtual prop.

In step 204, whether the target virtual prop falls onto the target position is determined.

Here, when the target virtual prop falls onto the target position, that is, the target virtual prop lands, step 205 is executed. Otherwise, step 203 is executed.

In step 205, a virtual image corresponding to the first virtual object is presented at the target position.

Here, after the target virtual prop falls onto the target position, a 1:1 holographic projection, i.e., a virtual image, of the first virtual object is generated at the target position. In the virtual scene from the enemy's perspective, the virtual projection is consistent with the appearance of the first virtual object using the target virtual prop.

Figure 16:
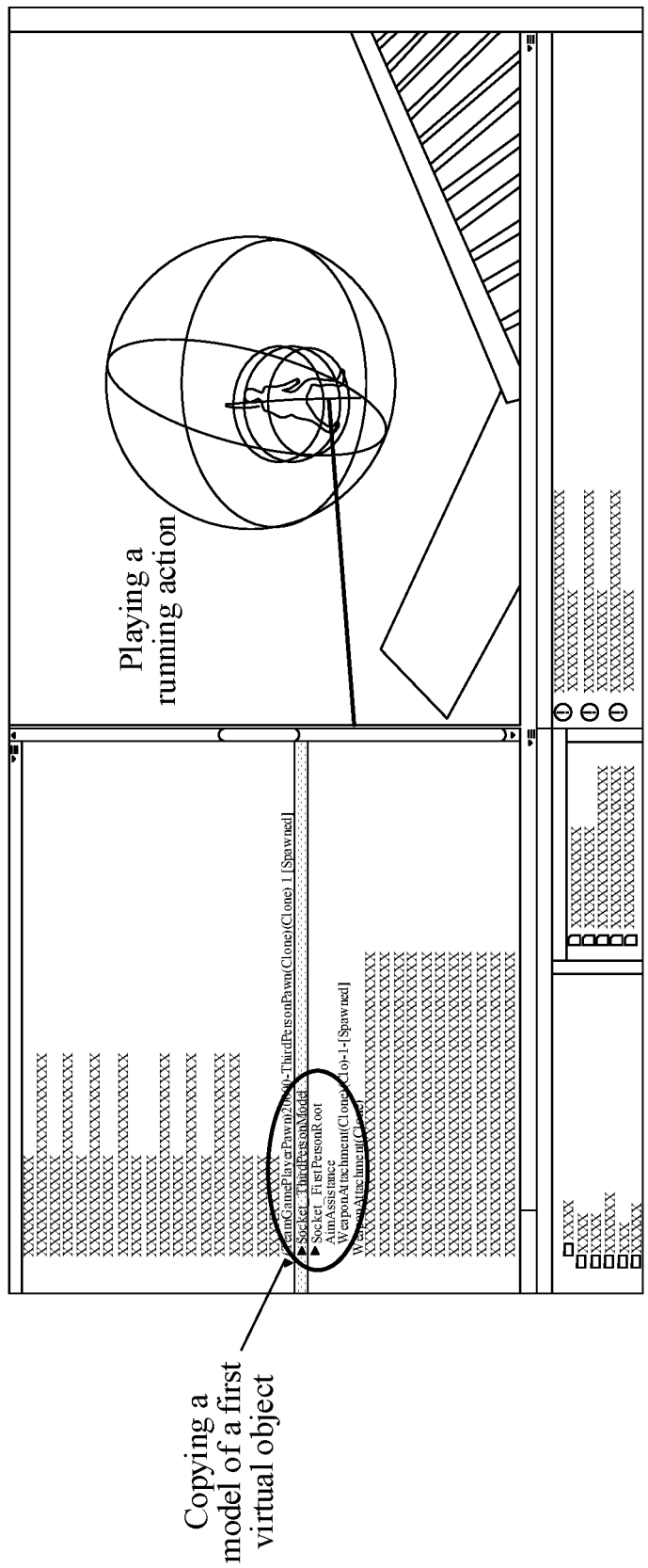
FIG. 16 is a schematic diagram of projection display provided by an embodiment of this application.

Referring to FIG. 16, it is a schematic diagram of projection display provided by the embodiment of this application. In actual implementation, firstly, the model of the first virtual object using the target virtual prop is copied, then the target position that the target virtual prop lands is acquired, and the copied model of the first virtual object is generated at the target position. Whenever the player controls the first virtual object to update action through the terminal, for example, switch from an idle action to a firing action, change the ammunition or open a sight, the terminal will synchronize the updated action of the first virtual object to the server, and the server will broadcast the updated action of the first virtual object to all players in the virtual scene, and then let the action in the model of the first virtual object that is holographically projected update with the action update of the first virtual object.

In step 206, whether the player updates the action is determined.
> when the player updates the action, step 207 is executed. Otherwise, step 205 is executed.

In step 207, the action of the virtual image is updated at the target position.
> in step 208, whether the virtual image is attacked is determined.

Here, whether the virtual image is attacked by the second virtual object is determined, and in response to determine that the virtual image is attacked by the second virtual object, step 209 is executed. Otherwise, step 207 is executed.

In step 209, the position of the second virtual object in the game scene is presented.

Here, when the virtual image is hit by the second virtual object, the position of the second virtual object in the virtual scene is exposed. For example, the attack position that the second virtual object attacks the virtual image can be presented on the map thumbnail of the virtual scene, or the attack position that the second virtual object attacks the virtual image may be presented in a perspective view of the virtual scene, so that the second virtual object at the attack position is visible relative to the first virtual object.

Figure 17:
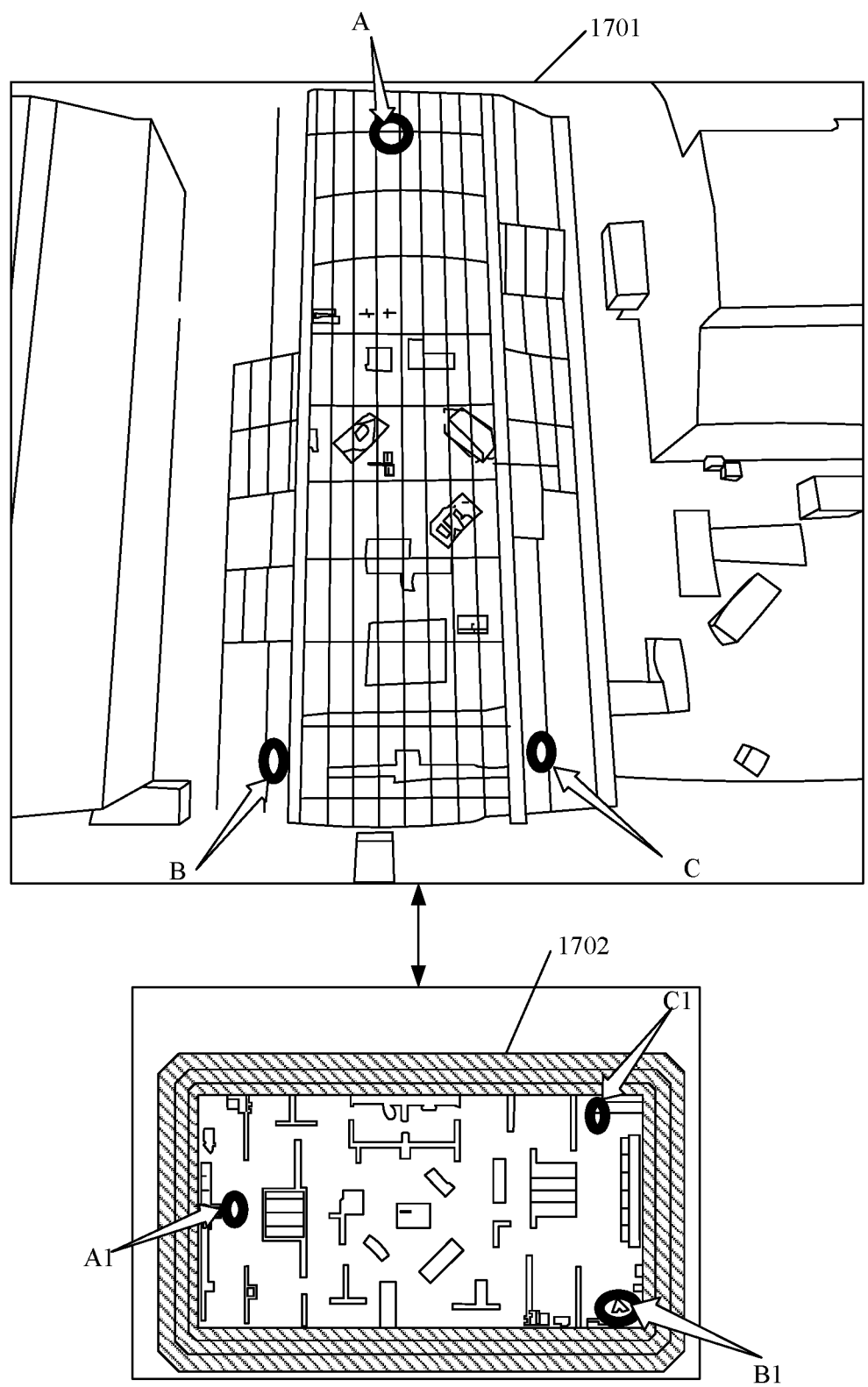
FIG. 17 is a schematic diagram of a mapping relationship between a space display map of a virtual scene and a map thumbnail provided by an embodiment of this application.

Referring to FIG. 17, it is a schematic diagram of a mapping relationship between a spatial display map and a map thumbnail of the virtual scene provided by the embodiment of this application. When constructing a mapping relationship between a spatial display map 1701 and a map thumbnail 1702, a mapping relationship between three points (A, B, C) selected in the spatial display map 1701 and three points (A1, B1, C1) selected in the map thumbnail 1702 can be established. After the mapping relationship is established, when the player selects a target position P of the target virtual object in the plane display map 1701, the target position P is connected with the above three points in the plane display map 1701 to obtain the distances and directions of the three lines, that is, AP, BP and CP. Then, in the map thumbnail 1702, A1P1, B1P2 and C1P3 are acquired according to the mapping relationship between the two maps and the directions and distances of the three lines. That is, three points P1, P2 and P3 are acquired. Finally, based on the acquired three points P1, P2 and P3, the average value P0 of the three points is obtained, and P0 is the position to be displayed in the map thumbnail.

In step 210, whether the perspective presentation time has ended.

In actual implementation, the terminal can acquire the perspective presentation time length corresponding to the second virtual object, and execute step 211 when the perspective presentation time length reaches the target time length, that is, in response to determine that the perspective presentation time ends. Otherwise, step 209 is executed.

In step 211, the presentation of the position of the second virtual object in the game scene is canceled.

Here, when the perspective presentation time ends, in the virtual scene, the perspective presentation of the second virtual object at the interaction position is canceled. For example, in the perspective of the first virtual object, a perspective presentation effect of 1 second is generated in the virtual scene to perspectively present the position of the second virtual object. In this way, the first virtual object can know in advance the distance, height and other information of the enemy player (i.e., the second virtual object) relative to himself (i.e., the first virtual object), and make a corresponding strategic layout based on the enemy's position, thus obtaining great advantages in the battle process.

In the above way, the virtual image of the first virtual object can be arranged to a designated position by using the passively triggered target virtual prop. After the second virtual object hits the virtual image, the position information of the second virtual object in the game can be acquired, so that the first virtual object can make a corresponding strategic layout, making up for the gap that the position information of the virtual object cannot be obtained in the early stage of the battle. At the same time, compared with the method for acquiring the position of the virtual object by performing multiple interactions with other virtual objects, the method for acquiring the position in the virtual scene provided by this application has higher acquisition efficiency and improves the human-computer interaction efficiency. Moreover, since the target virtual prop in the embodiment of the present application is a passive trigger prop, and the position of the virtual object can only be displayed when it is hit, the strength of the prop is effectively controlled, which helps to maintain the ecological balance of the game.

Figure 18:
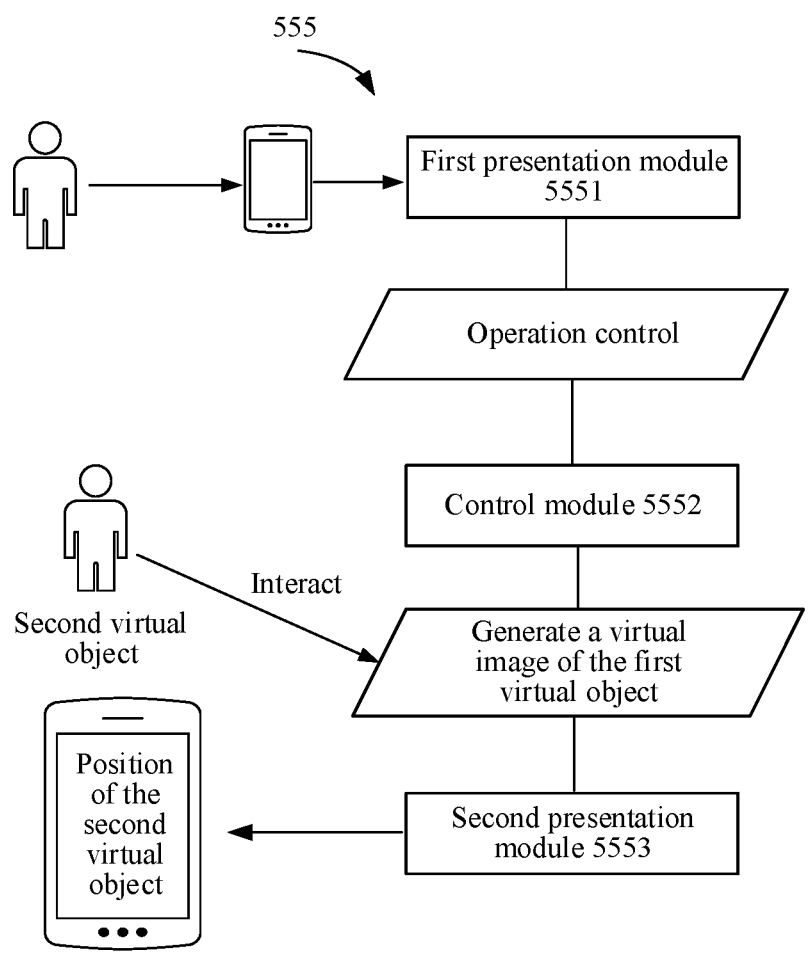
FIG. 18 is a schematic structural diagram of an apparatus for acquiring a position in a virtual scene provided by an embodiment of this application.

Next, an exemplary structure of an apparatus 555 for acquiring a position in a virtual scene provided by the embodiment of this application implemented as software modules will be described. In some embodiments, referring to FIG. 18, which is a schematic structural diagram of the apparatus for acquiring the position in the virtual scene provided by the embodiment of this application, the apparatus 555 for acquiring the position in the virtual scene provided by the embodiment of this application includes:
> a first presentation module 5551 configured to present an operation control of a target virtual prop in a virtual scene;
> a control module 5552 configured to, in response to a virtual image generation operation on the operation control, control a first virtual object to generate a virtual image corresponding to the first virtual object in the virtual scene by using the target virtual prop;
> a second presentation module 5553 configured to, when a second virtual object interacting with the virtual image exists in the virtual scene, present a position of the second virtual object in the virtual scene.

In some embodiments, before the operation control of the target virtual prop is presented in a virtual scene, the apparatus further includes:
> a prop selection module configured to present a selection interface including at least one virtual prop icon in the virtual scene;
> present indication information of the virtual prop corresponding to the selected virtual prop icon in response to a selection operation for the virtual prop icon in the selection interface, the indication information being used for indicating the function of the virtual prop;
> determine the virtual prop as a target virtual prop in response to a determination operation for the selected virtual prop icon based on the indication information.

In some embodiments, the control module is further configured to, when the target virtual prop is a throwing type prop, present a target position in the virtual scene, and control the first virtual object to throw the target virtual prop to the target position:
> when the target virtual prop falls onto the target position, generating a virtual image corresponding to the first virtual object at the target position.

In some embodiments, the control module is further configured to, when the target virtual prop is a throwing type prop, present a throwing trajectory in the virtual scene, and control the first virtual object to throw the target virtual prop along the throwing trajectory:

when the target virtual prop reaches a target position along the throwing trajectory, generating a virtual image corresponding to the first virtual object at the target position.

In some embodiments, the control module is further configured to, when the target virtual prop is a launching type prop, control the first virtual object to launch a sub virtual prop by using the target virtual prop:

when the sub virtual prop falls onto a target position, generating a virtual image corresponding to the first virtual object at the target position.

In some embodiments, the control module is further configured to, when the target virtual prop is a placing type prop, controlling the first virtual object in the virtual scene to place the target virtual prop at a target position:

based on the target position, when a virtual image generation condition is satisfied, generating a virtual image corresponding to the first virtual object at the target position.

In some embodiments, before the position of the second virtual object in the virtual scene is presented, the apparatus further includes:

a detection module configured to, when the second virtual object using an interactive virtual prop in the virtual scene exists, acquire a detection ray consistent with an interaction direction of the interactive virtual prop and an interaction detection frame corresponding to the virtual image;

performing crossing detection on the detection ray and the interaction detection frame to obtain a detection result; and when the detection result indicates the detection ray crosses the interaction detection frame, determining that the second virtual object interacting with the virtual image exists in the virtual scene.

In some embodiments, before the position of the second virtual object in the virtual scene is presented, the apparatus further includes:

an output module configured to output image interaction prompt information used for prompting that the second virtual object interacting with the virtual image exists.

In some embodiments, the second presentation module is further configured to present a map thumbnail of the virtual scene:

presenting the position of the second virtual object in the virtual scene in the map thumbnail, wherein the position is a position of the second virtual object in the virtual scene when the second virtual object interacts with the virtual image.

In some embodiments, during the movement of the second virtual object in the virtual scene, the second presentation module is further configured to, when the second virtual object does not interact with the virtual image, maintain the position presented in the map thumbnail unchanged;

when the second virtual object interacts with the virtual image, updating the position presented in the map thumbnail.

In some embodiments, the second presentation module is further configured to, when the number of the second virtual objects is at least two, present the position of a target number of second virtual objects of the at least two second virtual objects in the virtual scene.

In some embodiments, the second presentation module is further configured to, acquire an interaction position of the second virtual object in the virtual scene when the second virtual object interacts with the virtual image:

in the virtual scene, presenting a perspective view of the second virtual object at the interaction position so that the second virtual object is in a visible state relative to the first virtual object.

In some embodiments, the second presentation module is further configured to present a map thumbnail of the virtual scene:

present, in the map thumbnail, the position of the second virtual object in the virtual scene when the second virtual object interacts with the virtual image.

Correspondingly, the second presentation module is further configured to present the moving position of the second virtual object in the map thumbnail during the movement of the second virtual object in the virtual scene.

In some embodiments, the apparatus further includes a cancellation module configured to present a perspective presentation countdown corresponding to the second virtual object; and when the perspective presentation countdown is reset to zero, cancel the perspective presentation of the second virtual object at the interaction position.

In some embodiments, the cancellation module is further configured to acquire and present the perspective presentation time length corresponding to the second virtual object; and when the perspective presentation time length reaches the target time length, cancel the perspective presentation of the second virtual object at the interaction position in the virtual scene.

An embodiment of this application provides a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the method for acquiring a position in a virtual scene in the embodiment of this application.

An embodiment of this application provides a computer-readable storage medium storing an executable instruction. When the executable instruction is executed by a processor, the processor is caused to perform the method for acquiring a position in a virtual scene in the embodiments of this application.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, or improvement made without departing from the spirit and range of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for acquiring a position of a virtual object in a virtual scene performed by an electronic device, the method comprising:
   presenting an operation control of a target virtual prop in a virtual scene;
   in response to a virtual image generation operation on the operation control, controlling a first virtual object to generate a virtual image corresponding to the first virtual object in the virtual scene by using the target virtual prop; and
   when at least two second virtual objects interacting with the virtual image exist in the virtual scene, presenting a position of a target number of the at least second virtual objects in the virtual scene.

2. The method according to claim 1, wherein the controlling a first virtual object to generate a virtual image corresponding to the first virtual object in the virtual scene by using the target virtual prop comprises:
   when the target virtual prop is a throwing type prop, presenting a target position in the virtual scene, and controlling the first virtual object to throw the target virtual prop to the target position; and
   when the target virtual prop falls onto the target position, generating the virtual image corresponding to the first virtual object at the target position.

3. The method according to claim 1, wherein the controlling a first virtual object to generate a virtual image corresponding to the first virtual object in the virtual scene by using the target virtual prop comprises:
   when the target virtual prop is a throwing type prop, presenting a throwing trajectory in the virtual scene, and controlling the first virtual object to throw the target virtual prop along the throwing trajectory; and
   when the target virtual prop reaches a target position along the throwing trajectory, generating the virtual image corresponding to the first virtual object at the target position.

4. The method according to claim 1, wherein the controlling a first virtual object to generate a virtual image corresponding to the first virtual object in the virtual scene by using the target virtual prop comprises:
   when the target virtual prop is a firing type prop, controlling the first virtual object to fire a sub virtual prop by using the target virtual prop; and
   when the sub virtual prop falls onto a target position, generating the virtual image corresponding to the first virtual object at the target position.

5. The method according to claim 1, wherein the controlling a first virtual object to generate a virtual image corresponding to the first virtual object in the virtual scene by using the target virtual prop comprises:
   when the target virtual prop is a placing type prop, controlling the first virtual object in the virtual scene to place the target virtual prop at a target position; and
   when a virtual image generation condition is satisfied, generating the virtual image corresponding to the first virtual object at the target position.

6. The method according to claim 1, wherein the method further comprises:
   before presenting the position of the target number of the at least second virtual objects in the virtual scene:
   acquiring a detection ray consistent with an interaction direction of an interactive virtual prop used by the at least second virtual objects and an interaction detection frame corresponding to the virtual image;
   performing crossing detection on the detection ray and the interaction detection frame to obtain a detection result; and
   when the detection result indicates the detection ray crosses the interaction detection frame, determining that the at least second virtual objects interact with the virtual image.

7. The method according to claim 1, wherein the method further comprises:
   before presenting the position of the target number of the at least second virtual objects in the virtual scene:
   outputting image interaction prompt information used for prompting that the at least second virtual objects interacting with the virtual image exists.

8. The method according to claim 1, wherein the presenting the position of the target number of the at least second virtual objects in the virtual scene comprises:
   presenting a map thumbnail of the virtual scene; and
   presenting the position of the at least second virtual objects in the virtual scene in the map thumbnail,
   wherein the position is a position of the at least second virtual objects in the virtual scene when the at least second virtual objects interact with the virtual image.

9. The method according to claim 1, wherein the presenting the position of the target number of the at least second virtual objects in the virtual scene comprises:
   acquiring an interaction position of the at least second virtual objects in the virtual scene when the at least second virtual objects interact with the virtual image; and
   presenting a perspective view of the at least second virtual objects at the interaction position in the virtual scene so that the at least second virtual objects are in a visible state relative to the first virtual object.

10. An electronic device, comprising:
    a memory, configured to store executable instructions; and
    a processor, configured to, when executing the executable instructions stored in the memory, cause the electronic device to perform a method for acquiring a position of a virtual object in a virtual scene, the method including:

presenting an operation control of a target virtual prop in a virtual scene;

in response to a virtual image generation operation on the operation control, controlling a first virtual object to generate a virtual image corresponding to the first virtual object in the virtual scene by using the target virtual prop; and when at least two second virtual objects interacting with the virtual image exist in the virtual scene, presenting a position of a target number of the at least second virtual objects in the virtual scene.

11. The electronic device according to claim 10, wherein the controlling a first virtual object to generate a virtual image corresponding to the first virtual object in the virtual scene by using the target virtual prop comprises:

when the target virtual prop is a throwing type prop, presenting a target position in the virtual scene, and controlling the first virtual object to throw the target virtual prop to the target position; and when the target virtual prop falls onto the target position, generating the virtual image corresponding to the first virtual object at the target position.

12. The electronic device according to claim 10, wherein the controlling a first virtual object to generate a virtual image corresponding to the first virtual object in the virtual scene by using the target virtual prop comprises:

when the target virtual prop is a throwing type prop, presenting a throwing trajectory in the virtual scene, and controlling the first virtual object to throw the target virtual prop along the throwing trajectory; and when the target virtual prop reaches a target position along the throwing trajectory, generating the virtual image corresponding to the first virtual object at the target position.

13. The electronic device according to claim 10, wherein the controlling a first virtual object to generate a virtual image corresponding to the first virtual object in the virtual scene by using the target virtual prop comprises:

when the target virtual prop is a firing type prop, controlling the first virtual object to fire a sub virtual prop by using the target virtual prop; and when the sub virtual prop falls onto a target position, generating the virtual image corresponding to the first virtual object at the target position.

14. The electronic device according to claim 10, wherein the controlling a first virtual object to generate a virtual image corresponding to the first virtual object in the virtual scene by using the target virtual prop comprises:

when the target virtual prop is a placing type prop, controlling the first virtual object in the virtual scene to place the target virtual prop at a target position; and when a virtual image generation condition is satisfied, generating the virtual image corresponding to the first virtual object at the target position.

15. The electronic device according to claim 10, wherein the method further comprises:

before presenting the position of the target number of the at least second virtual objects in the virtual scene:

acquiring a detection ray consistent with an interaction direction of an interactive virtual prop used by the at least second virtual objects and an interaction detection frame corresponding to the virtual image;

performing crossing detection on the detection ray and the interaction detection frame to obtain a detection result; and when the detection result indicates the detection ray crosses the interaction detection frame, determining that the at least second virtual objects interact with the virtual image.

16. The electronic device according to claim 10, wherein the method further comprises:

before presenting the position of the target number of the at least second virtual objects in the virtual scene:

outputting image interaction prompt information used for prompting that the at least second virtual objects interacting with the virtual image exists.

17. The electronic device according to claim 10, wherein the presenting the position of the target number of the at least second virtual objects in the virtual scene comprises:

presenting a map thumbnail of the virtual scene; and presenting the position of the at least second virtual objects in the virtual scene in the map thumbnail, wherein the position is a position of the at least second virtual objects in the virtual scene when the at least second virtual objects interact with the virtual image.

18. The electronic device according to claim 10, wherein the position of the target number of the at least second virtual objects in the virtual scene comprises:

acquiring an interaction position of the at least second virtual objects in the virtual scene when the at least second virtual objects interact with the virtual image; and presenting a perspective view of the at least second virtual objects at the interaction position in the virtual scene so that the at least second virtual objects are in a visible state relative to the first virtual object.

19. A non-transitory computer-readable storage medium, storing executable instructions that, when executed by a processor of an electronic device, cause the electronic device to perform a method for acquiring a position of a virtual object in a virtual scene, the method including:

presenting an operation control of a target virtual prop in a virtual scene;

in response to a virtual image generation operation on the operation control, controlling a first virtual object to generate a virtual image corresponding to the first virtual object in the virtual scene by using the target virtual prop; and when at least two second virtual objects interacting with the virtual image exist in the virtual scene, presenting a position of a target number of the at least second virtual objects in the virtual scene.

20. The non-transitory computer-readable storage medium according to claim 19, wherein the presenting the position of the target number of the at least second virtual objects in the virtual scene comprises:

acquiring an interaction position of the at least second virtual objects in the virtual scene when the at least second virtual objects interact with the virtual image; and presenting a perspective view of the at least second virtual objects at the interaction position in the virtual scene so that the at least second virtual objects are in a visible state relative to the first virtual object.

* * * * *